United States Patent
Mori et al.

(10) Patent No.: US 7,886,189 B2
(45) Date of Patent: Feb. 8, 2011

(54) MOBILE TERMINAL APPARATUS AND DIAGNOSIS METHOD FOR MOBILE TERMINAL APPARATUS

(75) Inventors: Kensaku Mori, Yokohama (JP); Koichi Asano, Yokosuka (JP); Akihiro Ichinose, Yokohama (JP); Yoshimasa Nishimura, Kawasaki (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 343 days.

(21) Appl. No.: 12/105,190

(22) Filed: Apr. 17, 2008

(65) Prior Publication Data

US 2008/0263398 A1 Oct. 23, 2008

(30) Foreign Application Priority Data

Apr. 19, 2007 (JP) ............................. 2007-110769

(51) Int. Cl.
*G06F 11/00* (2006.01)
(52) U.S. Cl. ........................................ 714/25; 455/423
(58) Field of Classification Search ........................ None
See application file for complete search history.

(56) References Cited

U.S. PATENT DOCUMENTS

| | | | | |
|---|---|---|---|---|
| 5,966,428 | A * | 10/1999 | Ortiz Perez et al. ...... | 379/27.02 |
| 2001/0006891 | A1 * | 7/2001 | Cho ........................... | 455/425 |
| 2002/0072359 | A1 * | 6/2002 | Moles et al. ................ | 455/425 |
| 2005/0090245 | A1 * | 4/2005 | Kim ........................... | 455/425 |
| 2006/0063520 | A1 * | 3/2006 | Fratti et al. ................. | 455/423 |
| 2007/0287387 | A1 | 12/2007 | Keum et al. | |

FOREIGN PATENT DOCUMENTS

| | | |
|---|---|---|
| JP | 2001-230725 | 8/2001 |
| JP | 2004-194247 | 7/2004 |
| JP | 2004-334869 | 11/2004 |
| JP | 2005-236492 | 9/2005 |
| JP | 2006-203792 | 8/2006 |
| JP | 2006-319828 | 11/2006 |
| JP | 2007-042082 | 2/2007 |
| KR | 2003-0081743 A | 10/2003 |

OTHER PUBLICATIONS

Japanese Office Action w/Translation.
"DM Diagnostics and Monitoring Requirements", Open Mobile Alliance, Feb. 9, 2007, Candidate Version 1.0, XP002492107, 23 pages.
European Search Report.

* cited by examiner

*Primary Examiner*—Michael C Maskulinski
(74) *Attorney, Agent, or Firm*—Crowell & Moring LLP

(57) ABSTRACT

To provide a mobile terminal apparatus with the lower communication cost in sending a log at the occurrence of a malfunction, abnormality or fault in the mobile terminal apparatus to a network. A diagnostic process for the malfunction is performed in accordance with a diagnostic policy acquired from the outside. An error code corresponding to the diagnostic result is generated. The generated error code is outputted. With an automatic fault diagnostic function of automatically analyzing the fault in the mobile terminal apparatus without directly sending the log collected in the mobile terminal apparatus to an analytic server, the communication cost can be reduced.

6 Claims, 24 Drawing Sheets

FIG. 2
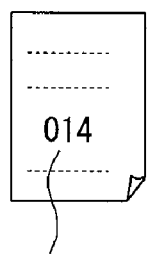
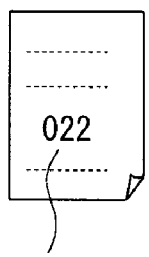
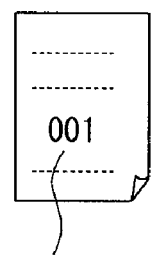
EC-1:ERROR CODE      EC-2:ERROR CODE      EC-3:ERROR CODE
     FIRST ITEM           SECOND ITEM           THIRD ITEM
 (MAKER, MODEL, ETC.)  (FAULT MAJOR ITEM)   (FAULT MINOR ITEM)

DIAGNOSTIC
REQUEST
ID:21
ID:25
ID:26

| ID | ANALYTICAL CONTENT | USE FUNCTION | |
|----|-----|-----|---|
| 1 | BATTERY | Check_battery() | ⎫ COMMON DIAGNOSTIC PROGRAM 102a |
| 21 | SW Version | Check_SW Version() | |
| 22 | EMPTY MEMORY CAPACITY | Check_Memory() | |
| 23 | | | |
| 24 | | ... | |
| 51 | GPS ABNORMAL END COUNT | Check_GPS() | ⎱ INDIVIDUAL DIAGNOSTIC PROGRAM 102b |
| 52 | DTV ABNORMAL END COUNT | Check_TV() | |

| ERROR CODE | ID | RESULT |
|---|---|---|
| | 1 | +1 |
| | 21 | 0 |
| | 22 | +1 |
| | ... | ... |
| | 51 | 0 |
| | 52 | +1 |
| | Total | +11 |

| ERROR CODE | CHARACTER STRING |
|---|---|
| | "MEMORY USE AMOUNT EXCEEDED" |
| | "EVENT START LIMIT EXCEEDED" |
| | ... |
| | ... |

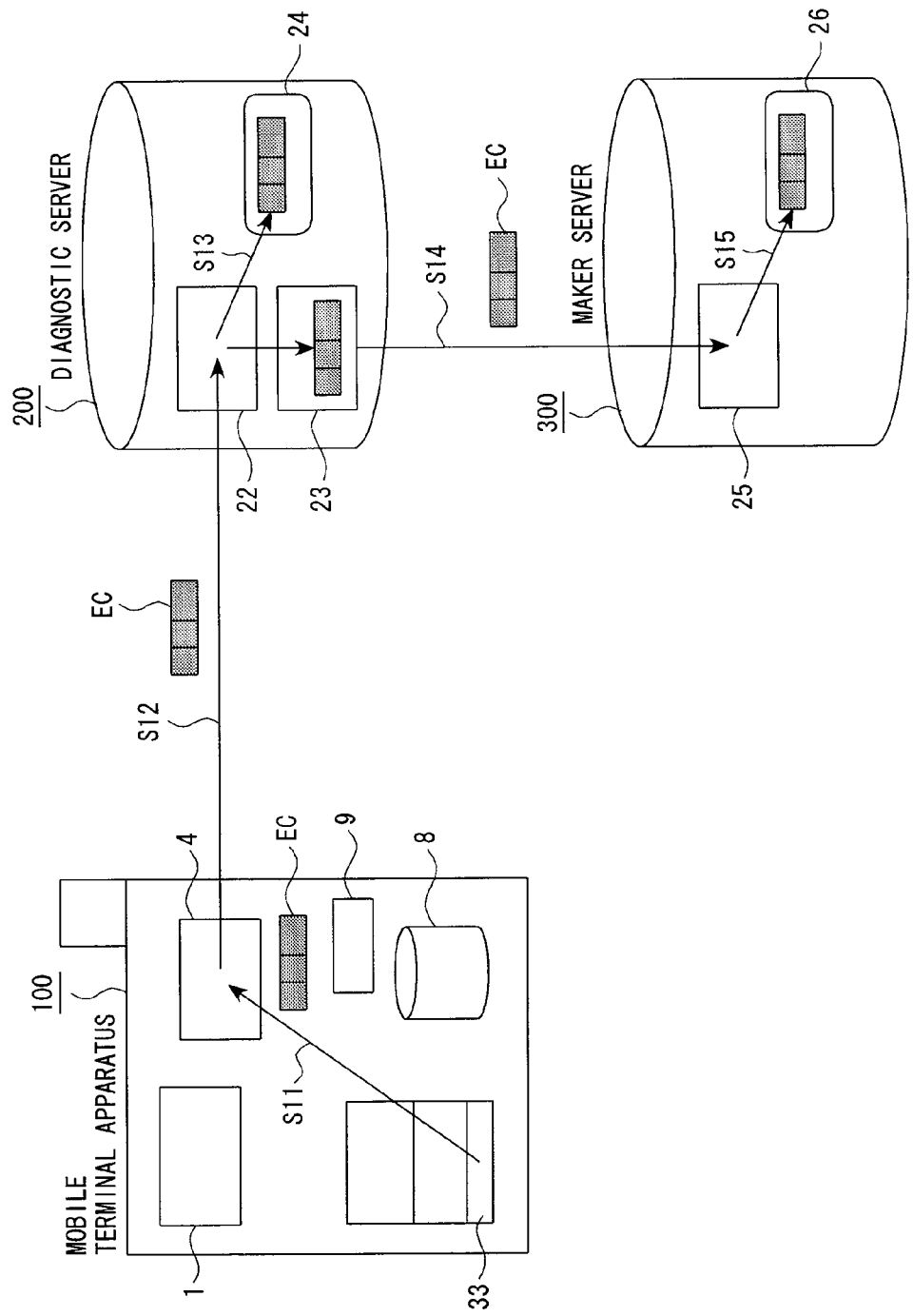

| ERROR CODE | DISPLAY CHARACTER STRING |
|---|---|
| 012-001-001 | "APPLICATION AREA CAPACITY EXCEEDED" |
| ⋮ | ⋮ |
| 012-345-677 | "MEMORY USE AMOUNT EXCEEDED" |
| 012-345-678 | "MEMORY USE AMOUNT EXCEEDED" |
| | ⋮ |

MOBILE TERMINAL APPARATUS AND DIAGNOSIS METHOD FOR MOBILE TERMINAL APPARATUS

BACKGROUND OF THE INVENTION

1. Field of the Invention

The present invention relates to a mobile terminal apparatus and a diagnosis method for the mobile terminal apparatus, and more particularly to a mobile terminal apparatus and a diagnosis method for the mobile terminal apparatus to diagnose a malfunction within the self system.

2. Description of the Related Art

In the mobile terminal apparatus such as a cellular phone, a fault or malfunction may occur. Generally, when a cause for the fault or malfunction that occurs is inspected, the fault information (hereinafter denoted to as a log) is acquired within the mobile terminal apparatus, and sent to an analytical server for a communication service provider (hereinafter referred to as a communication carrier) using a communication function, in which the cause is analyzed in the analytical server. The fault cause analyzed in the analytical server is displayed on an operator screen connected to the analytical server and handled at a fault window that peruses it.

The fault diagnosis of the mobile terminal apparatus as described here is a service in which when any malfunction occurs in the mobile terminal apparatus owned by the user, an external server at the remote site communicates with the mobile terminal apparatus to acquire a log of the mobile terminal apparatus to make the diagnosis and notify the result to a diagnosis window that reflects the settings of the mobile terminal apparatus or supports the beginner who uses the mobile terminal apparatus on the telephone remotely from the diagnosis window (e.g., refer to JP2006-319828A).

A difficult problem to deal with at the diagnosis window is treated by judging a fault cause from the displayed diagnostic result and making a required troubleshooting or a handling request to the outside. For example, the fault cause can be solved by asking a marker of the terminal apparatus that is the manufacturing company that finally receives the log to handle the fault, whereby the maker troubleshoots the fault by modifying a program for the terminal where the problem occurs and the same kind of terminal apparatus.

However, the above method has a problem that a lot of communication costs arise because (plural) logs are sent to a network after acquiring the log at the occurrence of a fault in the mobile terminal apparatus. Also, when the fault content displayed on the operator screen is indicated in a numerical code, the labor cost may arise on an operation of collating the numerical code and displaying the result as a character string recognizable by the operator.

The invention has been achieved to solve the above-mentioned problem with the prior art, and it is an object of the invention to provide a mobile terminal apparatus, and a diagnosis method for the mobile terminal apparatus, in which the communication cost in sending the log at the occurrence of malfunction, abnormality or fault to the network and the labor cost on the above operation can be suppressed.

SUMMARY OF THE INVENTION

According to a first aspect of the invention, there is provided a mobile terminal apparatus that diagnoses a malfunction in a self system, comprising diagnosis unit for making a diagnostic process for the malfunction in accordance with a diagnostic policy, and error code generation unit for generating an error code corresponding to a diagnostic result by the diagnosis unit, in which the error code generated by the error code generation unit is outputted.

With the first aspect of the invention, the error code corresponding to the diagnostic result is generated, and outputted, whereby the communication cost in sending the log at the occurrence of malfunction, abnormality or fault to the network and the labor cost on the above operation can be suppressed. In this specification, the malfunction, abnormality and fault may be generically called "malfunction", "abnormality" or "fault".

According to a second aspect of the invention, the mobile terminal apparatus according to first aspect further comprises diagnostic policy acquisition unit for acquiring the diagnostic policy from another unit.

With the second aspect of the invention, the diagnostic policy can be updated.

According to a third aspect of the invention, there is provided the mobile terminal apparatus according to first or second aspect, wherein the diagnostic process is implemented by a computer running a diagnostic program, in which the diagnostic program comprises a common diagnostic program for making the diagnosis for a common function to each terminal apparatus, and an individual diagnostic program for making the diagnosis for an intrinsic function to the self system, which is run after the common diagnostic program is run.

With the third aspect of the invention, the common function can be diagnosed using the common diagnostic program common to the makers of the terminal apparatuses, and diagnosis can be made by collecting the log in accordance with the features of hardware in each maker using the individual diagnostic program.

According to a fourth aspect of the invention, there is provided the mobile terminal apparatus according to any one of first to third aspects, wherein the error code includes an item of specifying the model of the terminal apparatus and an item on the content of the malfunction.

With the fourth aspect of the invention, using the error code is subdivided for every function to represent the function and the abnormal process separately, the function and the abnormal process can be combined, whereby the storage capacity for the error codes can be reduced by itemizing all the abnormal processes for all the functions.

According to a fifth aspect of the invention, the mobile terminal apparatus according to any one of first to fourth aspects further comprises unit for controlling an output destination for the error code generated by the error code generation unit.

With the fifth aspect of the invention, the generated error code is displayed on the display of the mobile terminal apparatus, or outputted to the external diagnostic server, whereby the cause of malfunction can be easily grasped.

According to a sixth aspect of the invention, the mobile terminal apparatus according to any one of first to fifth aspects further comprises character string translation unit for translating the error code generated by the error code generation unit into the corresponding character string.

With the sixth aspect of the invention, the error code is translated into the character string, and displayed on the display, whereby the fault cause can be easily grasped.

According to a seventh aspect of the invention, there is provided a diagnosis method for a mobile terminal apparatus to diagnose a malfunction in a self system, comprising a diagnostic step of making a diagnostic process for the malfunction in accordance with a diagnostic policy, an error code generation step of generating an error code corresponding to the diagnostic result at the diagnostic step, and an output step of outputting the error code generated at the error code generation step.

With the seventh aspect of the invention, the error code corresponding to the diagnostic result is generated and outputted, whereby the communication cost in sending the log at the occurrence of malfunction, abnormality or fault to the network and the labor cost on the above operation can be suppressed.

In a word, in the invention, the log collected in the mobile terminal apparatus is not directly sent to the analytic server, but with an automatic fault diagnostic function of automatically analyzing the fault in the mobile terminal apparatus, the error code corresponding to the diagnostic result is generated and outputted a send in smaller data units than the log, whereby the communication cost or the labor cost that was problematical with the prior method can be reduced.

The automatic fault diagnostic function of the mobile terminal apparatus according to the invention is implemented by the program that automatically runs without needing any operation impetus from the user. This program has a function of acquiring the log by detecting the fault occurring in the hardware and software of the mobile terminal apparatus without fail and a function of analyzing the cause using the log. The analytic result is displayed as the error code simplifying the log, not the log itself, on the display of the mobile terminal apparatus, whereby the fault cause can be grasped on the spot.

Also, the user needs to take an action of notifying the fault to the diagnostic window on the telephone or the like after grasping the fault cause. This invention offers a function that the mobile terminal apparatus automatically notifies the error code to save this trouble.

With the invention, the diagnostic result for the malfunction is translated into the error code and the error code after translation is displayed or outputted to the external server, whereby the communication cost and the labor cost on the operation can be lower than sending the log at the occurrence of fault to the network.

BRIEF DESCRIPTION OF THE DRAWINGS

FIG. 2 is a view showing a configuration example of an error code;

FIG. 6A is a view showing an example of a diagnostic policy file, FIG. 6B is a view showing an example of the items for a diagnostic program, FIG. 6C is a view showing an example of the results of diagnostic items executed, and FIG. 6D is a view showing an example of the display character strings corresponding to the error codes;

FIG. 7 is a view showing a use example of the error code;

DETAILED DESCRIPTION OF THE PREFERRED EMBODIMENTS

Figure 1:
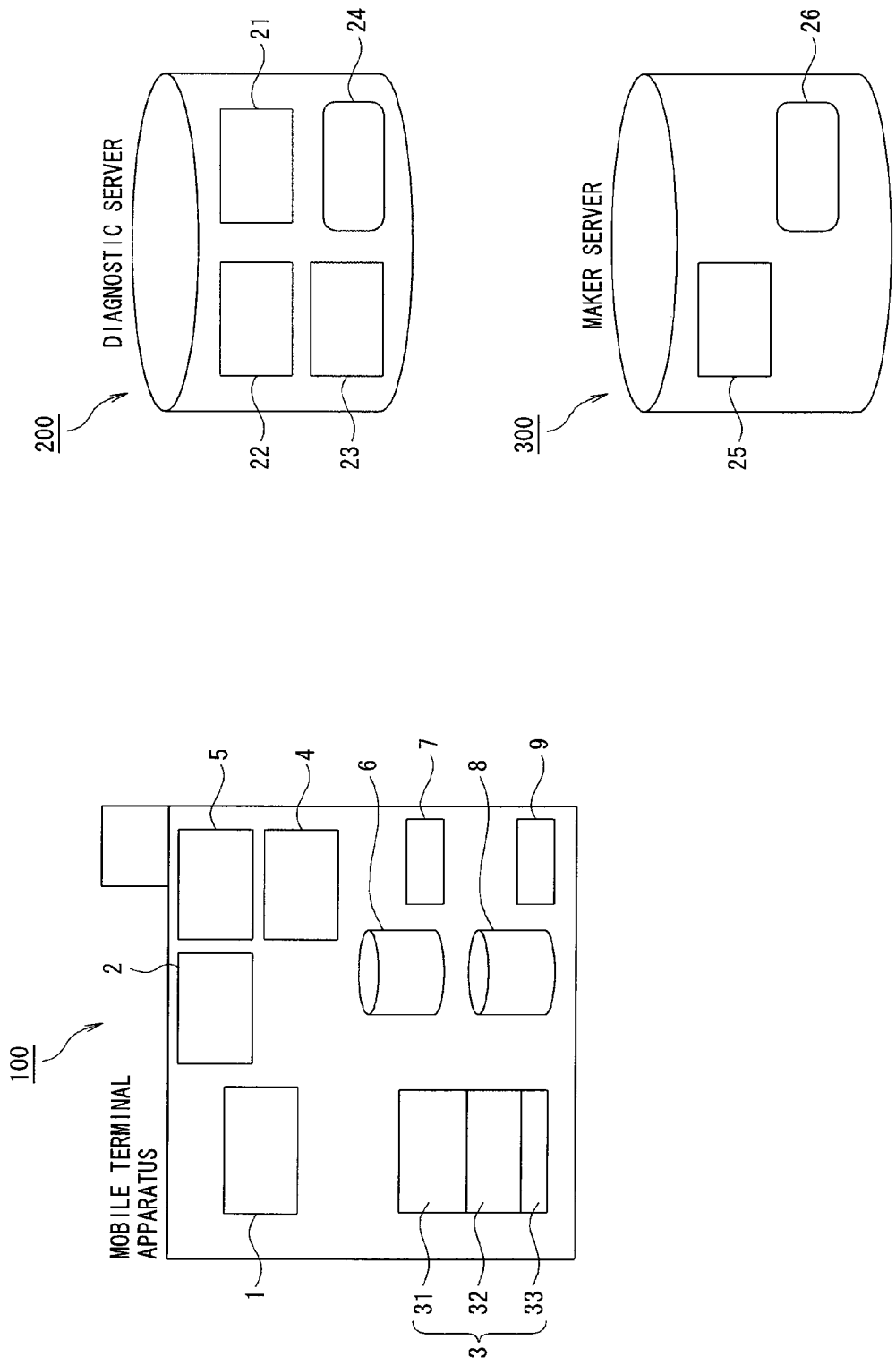
FIG. 1 is a block diagram showing the configuration of a fault diagnosis system using a mobile terminal apparatus according to an embodiment of the present invention.

An embodiment of the present invention will be described below with reference to the drawings. In the following description, the same or like parts are designated by the same reference numerals throughout the drawings.

(Configuration of Overall System)

FIG. 1 is a block diagram showing the configuration of a fault diagnosis system using a mobile terminal apparatus according to the embodiment of the invention. In FIG. 1, the fault diagnosis system of this embodiment comprises a mobile terminal apparatus 100 for use by the user, a diagnostic server 200 administered by a communication service provider, and a maker server 300 administered by the manufacturer of the mobile terminal apparatus.

The mobile terminal apparatus 100 has a log collection function 1 of collecting and storing the log information regarding malfunction, abnormality or fault that occurs within the unit, a diagnostic policy acceptance function 2 of accepting a diagnostic policy useful for diagnosis from the diagnostic server 200, an automatic fault diagnosis function 3 of automatically diagnosing the malfunction, abnormality or fault by executing a program, an error code output function 4 of generating an error code corresponding to the diagnostic result, a display output function 5 of displaying the error code, an error code translation table 6 of translating the error code into a display character string (i.e., character string displayed to the user), an error code translation function 7 of translating the error code into the display character string by referring to the error code translation table 6, an error code list storage function 8 of storing a list of error code, and an error code update function 9 of updating the error code.

With such a configuration, since the output destination for the generated error code can be controlled with the error code output function 4 or the display output function 5, the cause of malfunction can be easily grasped by displaying the error code on a display of the mobile terminal apparatus or outputting it to the external diagnostic server 200. Whether the error code is displayed on the display or outputted to the diagnostic server may be selected by the user operating a setting button, or in accordance with the specification of the mobile terminal apparatus.

In this embodiment, with the diagnostic policy acceptance function 2, the diagnostic policy is accepted from the diagnostic server 200 that is an external apparatus. This diagnostic policy may be prestored in a memory within the mobile terminal apparatus 100. When the diagnostic policy prestored in the mobile terminal apparatus 100 is not updated and continues to be used directly, it is unnecessary to provide the diagnostic policy acceptance function 2.

The diagnostic server 200 has a diagnostic policy sending function 21 of sending the diagnostic policy to the mobile terminal apparatus 100, an error code acceptance function 22 of accepting the error code, an error code output function 23 of outputting the error code, and an operator screen 24 for the operator to visually confirm the error code.

The maker server 300 has an error code acceptance function 25 of accepting the error code, and an operator screen 26 for the operator to visually confirm the error code.

(Organization of Error Code)

The error code for use in this embodiment is a combination of three items, including a first item EC-1 indicating the maker, model and the like, a second item EC-2 indicating a functional element within the mobile terminal apparatus where a fault occurs as a fault major item, and a third item EC-3 indicating the detailed content of the abnormality or fault that occurs as a fault minor item, as shown in FIG. 2. For the error code of this embodiment as shown in FIG. 2, the first item EC-1 is "014", the second item EC-2 is "022" and the third item EC-3 is "001". Since each item is denoted in character string, the entire error code is also denoted in character string. Using this error code, the detailed diagnostic information can be outputted with the lower communication cost of the mobile terminal apparatus than a method for transmitting the log directly in text or binary form.

In this way, the error code for use in this embodiment is subdivided into each function and represented. The function and the abnormal processing are divided, and combined, whereby the storage capacity for the list of error code can be reduced than itemizing all the abnormal processings.

If this configuration of error code is adopted, it is easier to add the item, when the function is extended in the future, and the abnormal processings are increased accordingly. That is, if there is provided a function of updating the list of error code in the mobile terminal apparatus from the diagnostic server, as will be described later, the new function or new terminal can be supported with by changing to the newly needed list of error code without altering the framework of error code scheme, when adding or updating the firmware or application.

This error code may be composed of the major item and the minor item into which the major item is subdivided as in this embodiment, or one item as the fault item.

(Configuration Embodiment of Mobile Terminal Apparatus)

Returning to FIG. 1, the internal configuration of the mobile terminal apparatus 100 for use in this system will be further described below.

In setting the error code, the user without expert knowledge, who is not the developer, or the diagnosis window of the communication carrier can not understand the fault cause, even if the result of fault is directly discharged as the log, because the configuration of hardware or software is naturally different for every terminal of each maker. The diagnostic result has a diagnostic value for the error that occurs commonly to each terminal and a diagnostic value dependent on the specific hardware. Even if the value dependent on the specific hardware is directly discharged as the error code, only the packaging maker receiving the error code can understand the fault cause correctly. By returning the explanatory information from the maker to the window of the communication carrier or the user again, the information can be shared but a redundant process is required, whereby there is possibility that the explanation can not be fully expanded.

Thus, in this system, a process for generating the error code with an individual diagnostic program for the fault log of hardware or software is performed. That is, the error code common to all the makers is generated by executing a common diagnostic program, and the error code intrinsic to each maker is generated by executing the individual diagnostic program.

The above process is implemented by the automatic fault diagnosis function 3 within the mobile terminal apparatus 100. This automatic fault diagnosis function 3 is implemented by executing the common diagnostic program 31 for diagnosing the cause of fault common to all the terminal apparatus makers, the individual diagnostic program 32 for making the diagnosis dependent on the hardware or software of maker on its own, and an error code generation program 33 for generating the error code corresponding to the result of analysis with these diagnostic programs on a CPU (Central Processing Unit) within the unit.

The common diagnostic program 31 can be applied by using the program common to the terminal apparatus makers. On the contrary, for the individual diagnostic program 32, it is required that each maker makes the packaging to collect the log according to the features of hardware for the diagnosis.

(Process at the Occurrence of Fault)

Figure 3:
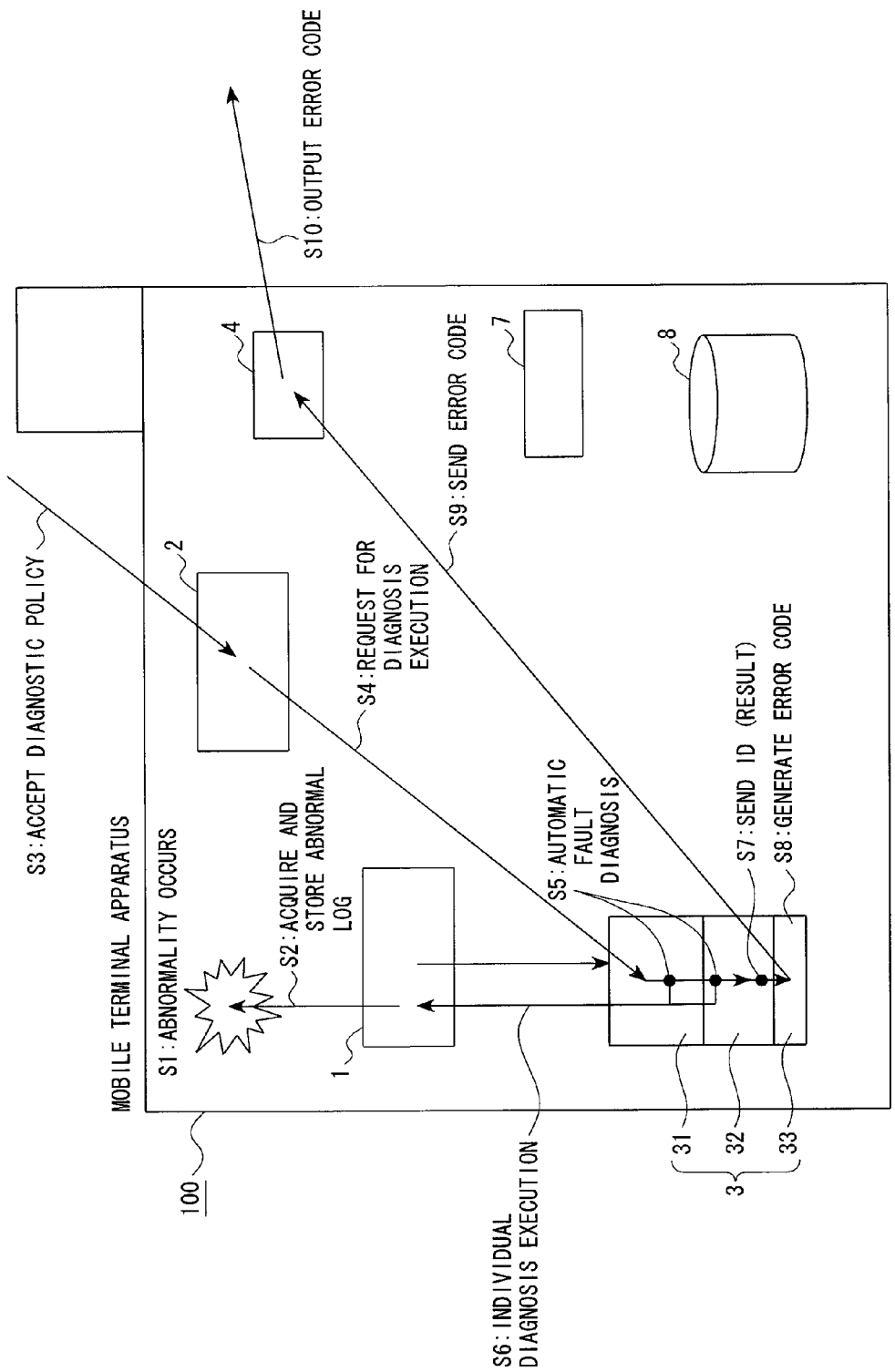
FIG. 3 is a view showing a process for outputting the error code at the occurrence of a fault in the mobile terminal apparatus.

Referring to FIG. 3, a process for outputting the error code at the occurrence of a fault in the mobile terminal apparatus will be described below. In FIG. 3, if an abnormality such as an error occurs within the mobile terminal apparatus (step S1), a fault log is acquired using the log collection function 1, and stored (step S2). This log is passed to the automatic fault diagnosis function 3. The automatic fault diagnosis function 3 makes the diagnosis for the log.

As a premise for making the diagnosis, it is required to accept a diagnostic policy useful for the diagnosis with the diagnostic policy acceptance function 2 (step S3). The diagnostic policy is accepted by the diagnostic policy acceptance function 2, and a diagnosis execution request is sent from the diagnostic policy acceptance function 2 to the automatic fault diagnosis function 3 (step S4).

As described above, the automatic fault diagnosis function 3 is implemented by the common diagnostic program 31, the individual diagnostic program 32, and the error code generation program 33. In making the automatic fault diagnosis (step S5), besides the common diagnosis by executing the common diagnostic program 31, the individual diagnosis by executing the individual diagnostic program 32 is performed (step S6). Thereafter, the ID (or IDs) with the abnormal diagnostic result among the IDs indicating the items of the diagnostic program is sent to the error code generation program 33 (step S7). And the error code is generated by executing the error code generation program 33 (step S8). When the error code is generated by the error code generation program 33, a list of error code stored in the error code list storage function 8 is referred to.

The generated error code is sent to the error code output function 4 (step S9). The error code output function 4 outputs the error code to the outside (step S10).

Figure 4:
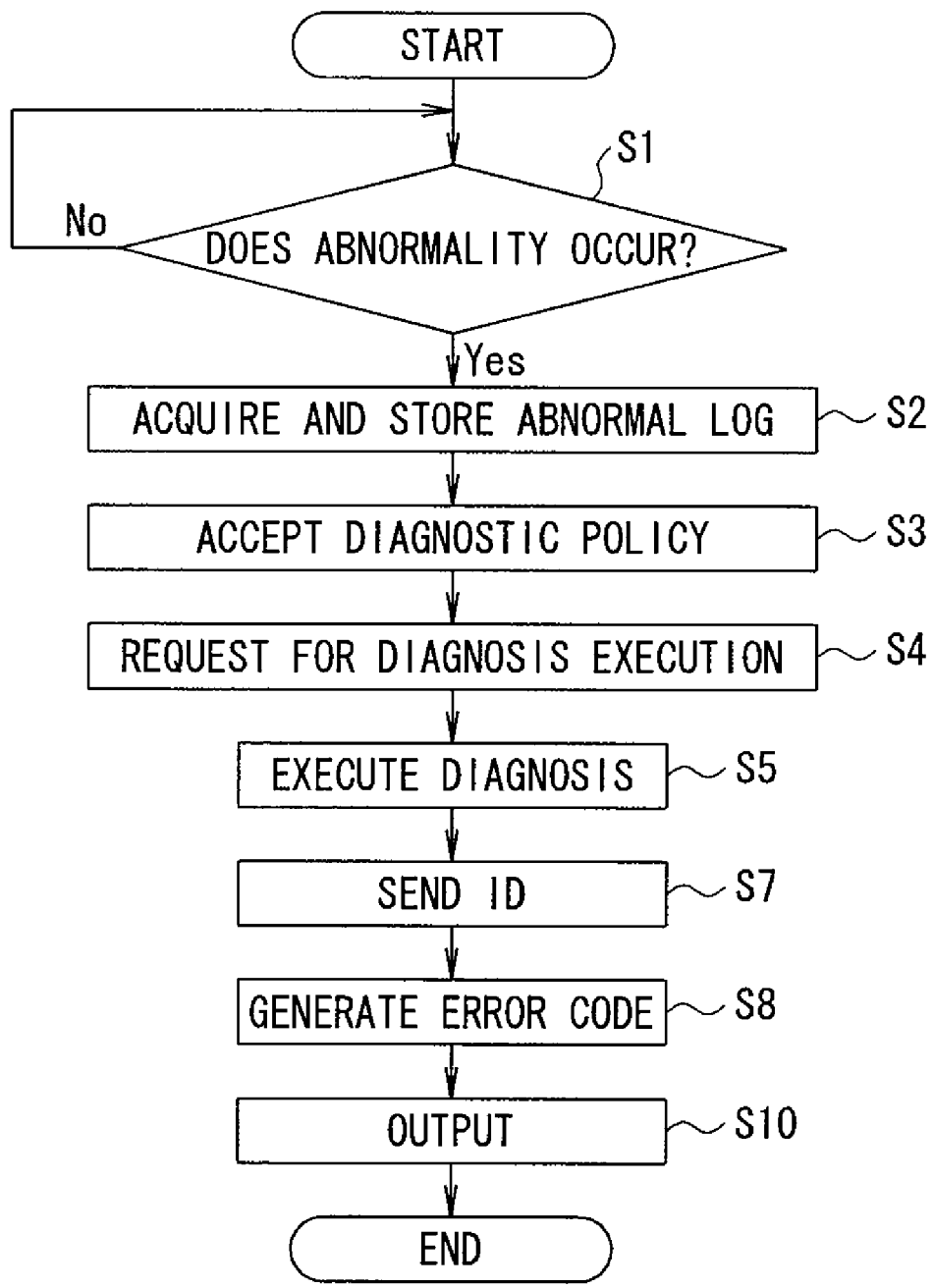
FIG. 4 is a flowchart corresponding to the process as explained with reference to FIG. 3.

FIG. 4 is a flowchart corresponding to the process as explained with reference to FIG. 3. In FIG. 4, if an abnormality occurs on standby, an abnormal log is acquired and stored (step S1→S2). Thereafter, a diagnostic policy is accepted (step S3), and a diagnosis execution request is sent (step S4). Thereby, the diagnostic program is executed (step S5).

The ID (or IDs) with the abnormal diagnostic result among the IDs indicating the items of the diagnostic program is sent (step S7), and an error code is generated (step S8). The generated error code is outputted from the mobile terminal apparatus (step S10). In this case, the error code is sent to the diagnostic server or outputted to the display of the mobile terminal apparatus.

(Flow of Automatic Fault Diagnosis)

Figure 5:
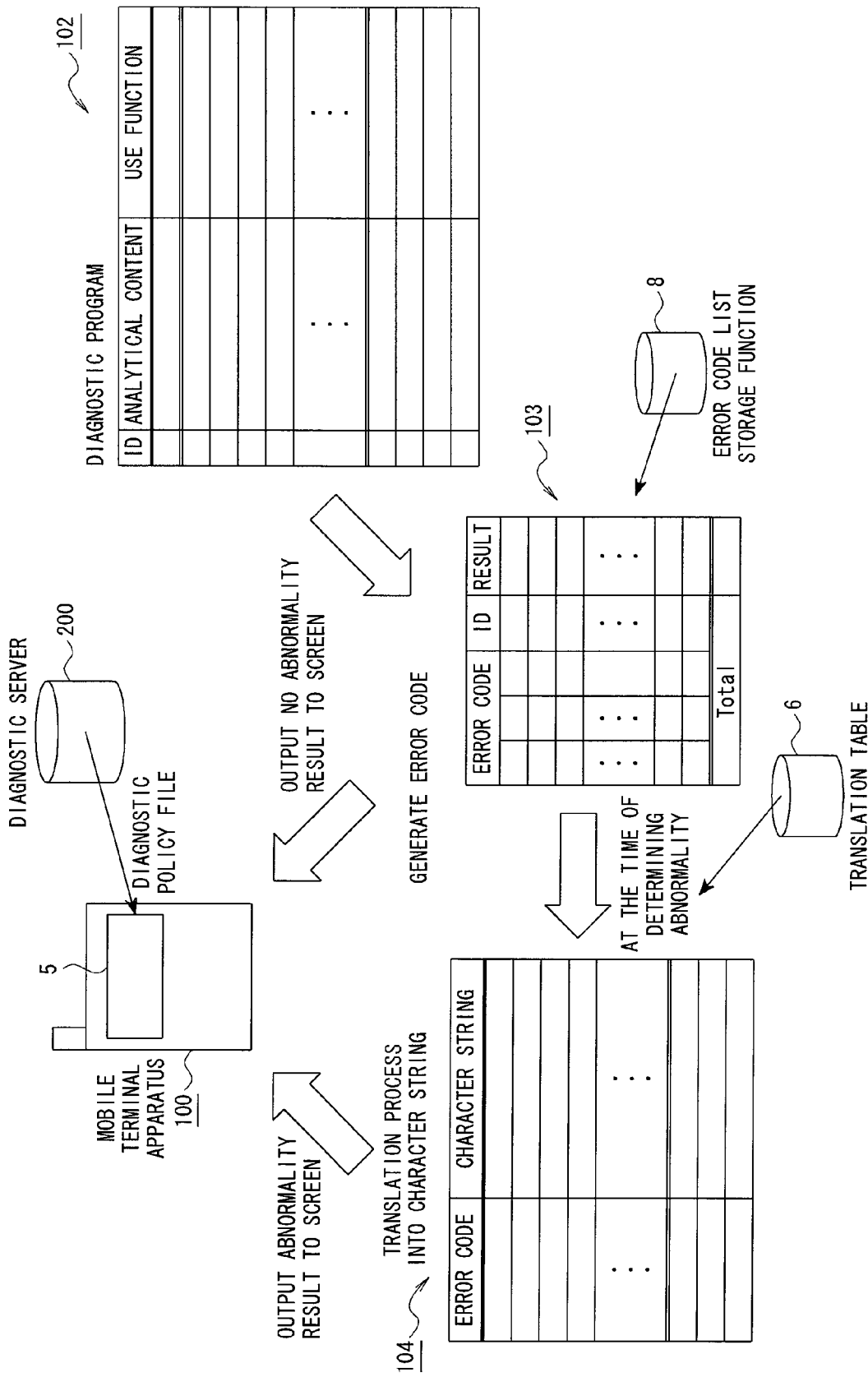
FIG. 5 is a view showing the flow of an automatic fault diagnosis with an automatic fault diagnosis function.

FIG. 5 shows the flow of the automatic fault diagnosis with the automatic fault diagnosis function 3. In FIG. 5, in the mobile terminal apparatus 100, first of all, the diagnostic program is executed based on a diagnostic policy 101 accepted from the diagnostic server 200 administered by the communication carrier. The diagnostic policy file 101 contains the designated ID (or IDs) of diagnostic items included in the diagnostic program 102 and a request for diagnosing them, for example, as shown in FIG. 6A. For example, ID: 21, ID: 25, ID: 26 and so on are designated, and the diagnostic items corresponding to these designated IDs are diagnosed. An example of the items in a diagnostic program 102 is shown in FIG. 6B. In FIG. 6B, the diagnostic program ID "1" is the analytical content "battery" that is the item of the diagnostic program, corresponding to the use function "Check battery( )" in this embodiment. Also, the diagnostic program ID "21" is the analytical content "SW Version" that is the item of the diagnostic program, corresponding to the use function "Check SW Version( )". Further, the diagnostic program ID "22" is the analytical content "empty memory capacity" that is the item of the diagnostic program, corresponding to the use function "Check Memory( )". Similarly, the diagnostic program ID "51" is the analytical content "GPS abnormal end count" corresponding to the use function "Check GPS( )", and the diagnostic program ID "52" is the analytical content "DTV abnormal end count" corresponding to the use function "Check TV( )". In this embodiment, the diagnostic program IDs "1" to "50" are a common diagnostic program 102a, and the diagnostic program ID "51" and beyond are an individual diagnostic program 102b.

Returning to FIG. 5, if the item corresponding to the ID group included in the diagnostic policy file 101 among the diagnostic items included in the diagnostic program 102 is executed, the executed diagnostic item result 103 is acquired. In this embodiment, the executed diagnostic item result 103 is "0" if the diagnostic result has no problem, and "+1" if the diagnostic result has any problem. And the total value (Total) of "+1" is calculated, as shown in FIG. 6C. The total value is "+11" in this embodiment.

Returning to FIG. 5, if the total value of execution results for all the diagnostic programs finally exceeds a certain threshold, the terminal is judged to be "abnormal". In this case, an error code is generated by referring to the error code translation table 6, and the generated error code is translated into the corresponding display character string 104. For example, the error code is translated into the corresponding character string "memory use amount exceeded" or "event start limit exceeded", as shown in FIG. 6D.

Returning to FIG. 5, if the terminal is judged to be "abnormal", a message indicating the abnormality and the display character string corresponding to the error code are outputted to the display of the mobile terminal apparatus. The above threshold may be distributed together with the diagnostic policy file from the diagnostic server 200, or decided as "80%" of the number of IDs included in the sent diagnostic policy file, or "10" in the absolute value.

Herein, the analytical contents of the diagnostic program in this embodiment include acquisition of software version, acquisition of abnormal end count, and acquisition of empty memory capacity. For example, if the empty memory capacity is 5% or less, the terminal is judged as abnormal, and whether or not the terminal is abnormal is returned for every item.

Thereafter, in the mobile terminal apparatus, the ID (or IDs) of diagnosis item with the analysis result of "+1" is extracted from the diagnostic program execution results. At this time, the extracted ID (or IDs) is (are) collated with the error code list storage function 8. Herein, the ID (or IDs) is (are) translated into the error code by referring to the list of error code stored in the error code list storage function 8. The first to third items of the error code resulting from the translation are passed to the error code generation program.

The error code generation program generates an individual error code for each fault cause by concatenating these factors. As described above with reference to FIG. 2, the error code is composed of three items denoted by a few bytes in this embodiment.

(Error Code Generation Example)

Returning to FIG. 5, the memory use amount exceeded is taken as an example of error code generation at the occurrence of an error. This fault may cause a malfunction such as a delay in the operation of the terminal if a large amount of memory is consumed when a plurality of events occur in the mobile terminal apparatus. When this malfunction occurs, the mobile terminal apparatus 100 acquires the possible fault information with the log collection function. The transition of the memory use ratio is also included in the acquired fault information.

Further, the mobile terminal apparatus 100 analyzes the acquired fault information by executing the common diagnostic program of the automatic fault diagnosis function to detect the abnormality in part of the log information on the memory use and specify the cause. And the character string with three items (see FIG. 2) concatenated is outputted as the error code. For example, "012-345-678" is outputted.

As a result, if the fault information can not be analyzed by executing the common diagnostic program, the fault may possibly result from the fault of hardware or software itself for the function intrinsic to the mobile terminal apparatus. Therefore, the fault information is analyzed by executing the individual diagnostic program after executing the common diagnostic program.

A diagnosis method by executing the individual diagnostic program is the same as with the above common diagnostic program. The individual diagnostic program is the program for diagnosing the diagnostic items intrinsic to the model. For example, the item dependent on the function, such as whether or not a GPS (Global Positioning System) is mounted or whether or not a DTV (Digital Television) is mounted, and the item dependent on the maker are diagnosed. In this embodiment, the "GPS abnormal end count" and the "DTV abnormal end count" are diagnosed.

The individual diagnostic program traces the fault information for each maker and each model, using the state transition information for the normal operation, to detect a difference from the normal operation. A process for this detection result is the same as above. The generated error code is outputted to the diagnostic server 200 that is installed outside, using the error code output function.

Also, if the number of errors does not exceed a predetermined threshold, there is no abnormality, whereby the result is displayed on the display of the mobile terminal apparatus 100, as shown in FIG. 5. On the other hand, if the number of errors exceeds the predetermined threshold, it is judged that the abnormality is present, whereby the error code is translated into the corresponding display character string by referring to the error code translation table 6. And the display character string after translation is displayed on the display of the mobile terminal apparatus 100.

(Use Example of Error Code)

Referring to FIG. 7, a use example of the error code outputted from the mobile terminal apparatus with this configuration will be described below. The error code EC is generated by the error code generation program 33 after the diagnostic program within the mobile terminal apparatus 100 is executed (step S11). This generated error code EC is outputted from the mobile terminal apparatus 100 with the error code output function 4 (step S12). The error code EC outputted from the mobile terminal apparatus 100 is sent through a network to the diagnostic server 200. The diagnostic server 200 accepts the error code EC, using the error code acceptance function 22 (step S12'). And the diagnostic server 200 displays the error code on the operator screen 24 of the diagnostic server 200 (step S13).

The operator who uses the diagnostic server 200 acquires the fault information by referring to this error code. Also, the diagnostic server 200 displays the error code on the operator screen 24 and at the same time, transfers the error code EC to the maker server 300 using the error code output function 23 (step S14). The maker server 300 accepts the error code EC using the error code acceptance function 25 in the same way as the diagnostic server 200 (step S14'), and displays it on the operator screen 26 (step S15).

Figure 8:
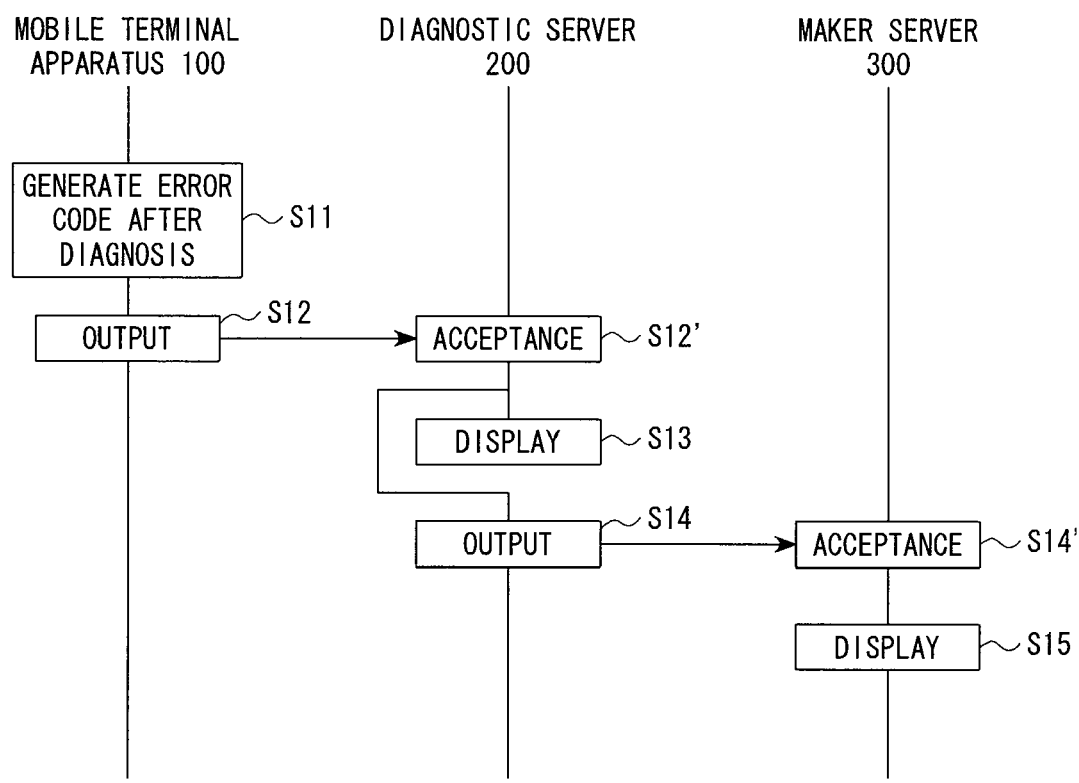
FIG. 8 is a sequence diagram showing a process for each device in FIG. 7.

FIG. 8 is a sequence diagram showing a process for each device. In FIG. 8, an error code EC is generated after the diagnostic program in the mobile terminal apparatus 100 is executed (step S11). The generated error code EC is outputted from the mobile terminal apparatus 100 (step S12), and accepted by the diagnostic server 200 (step S12').

In the diagnostic server 200, the error code is displayed on the operator screen 24 (step S13).

Further, the error code is outputted from the diagnostic server 200 (step S14), and accepted by the maker server 300 (step S14'). In the maker server 300, the error code is also displayed on the operator screen 26 (step S15).

Through the above process, the load on the network can be reduced by sending the error code composed of a few bytes, but not the log information itself.

The above is one series of processes for acquiring the fault information at the diagnosis window and in the maker using the automatic fault diagnosis function in the mobile terminal apparatus.

Figure 9:
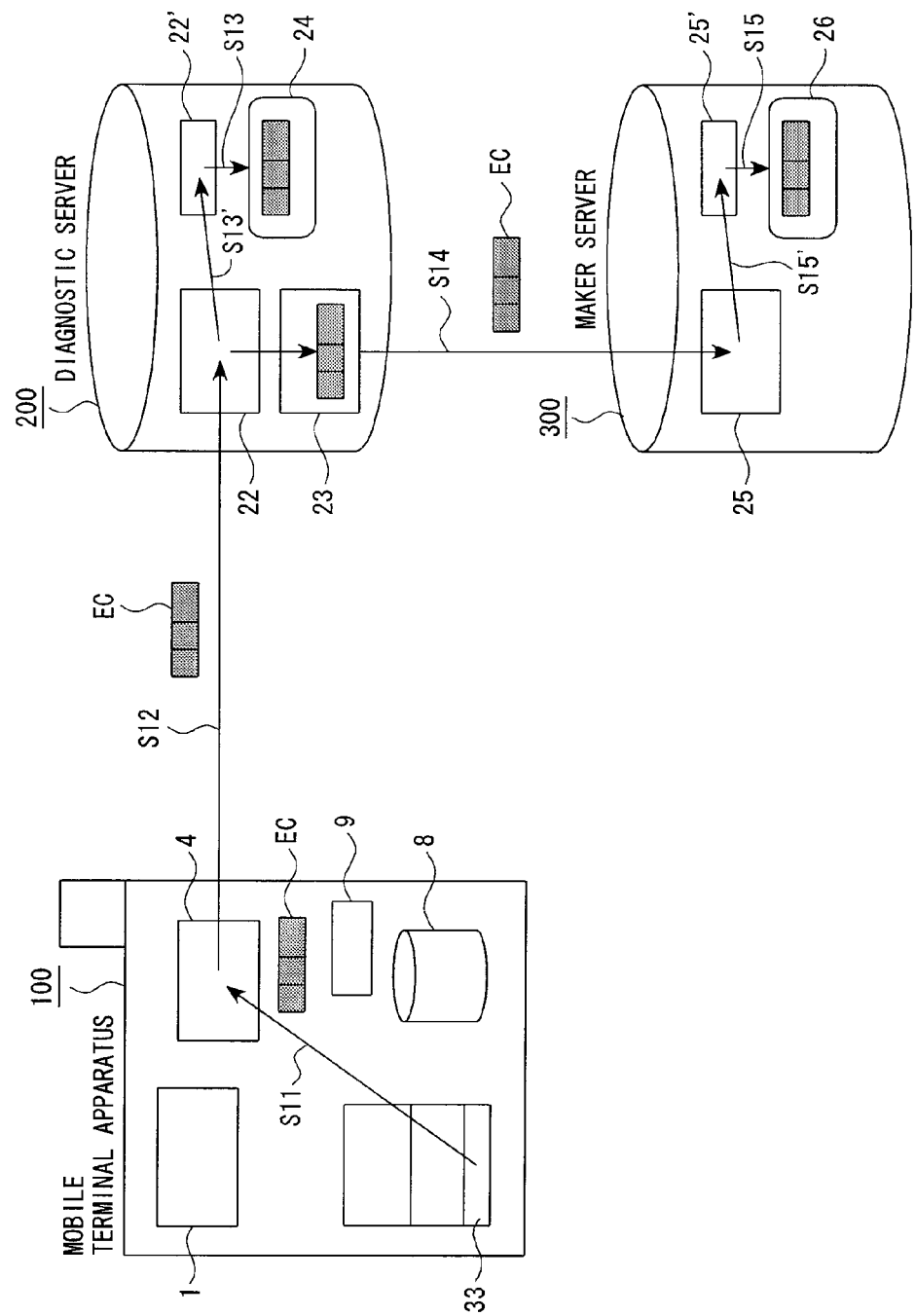
FIG. 9 is a view showing another use example of the error code.

Though the error code is displayed on the operator screen in the diagnostic server 200 and the maker server 300 as above described, the error code may be translated into the corresponding display character string and displayed on the operator screen. Referring to FIG. 9, the process in this case will be described below. After the diagnostic program within the mobile terminal apparatus 100 is executed, the error code EC is generated (step S11), as shown in FIG. 9. This error code is outputted from the mobile terminal apparatus 100 to the diagnostic server 200 (step S12). The diagnostic server 200 accepts this error code using the error code acceptance function 22, and then translates the error code into the display character string using the error code translation function 22' and the translation table (not shown) (step S13'). The display character string after translation is displayed on the operator screen 24 (step S13). The operator who operates the diagnostic server reads the fault cause from the display character string displayed on the screen and handles the fault.

Similarly, the maker server can also implement the display on the operator screen with the same factors. The diagnostic server 200 displays the display character string on the operator screen 24 and at the same time, transfers the error code to the maker server 300 using the error code output function 23 (step S14). The maker server 300 accepts the error code using the error code acceptance function 25 and the translation table (not shown) in the same way as the diagnostic server 200, and then translates the error code into the display character string using the error code translation function 25' (step S15'). This display character string after translation is displayed on the operator screen 26 (step S15).

Figure 10:
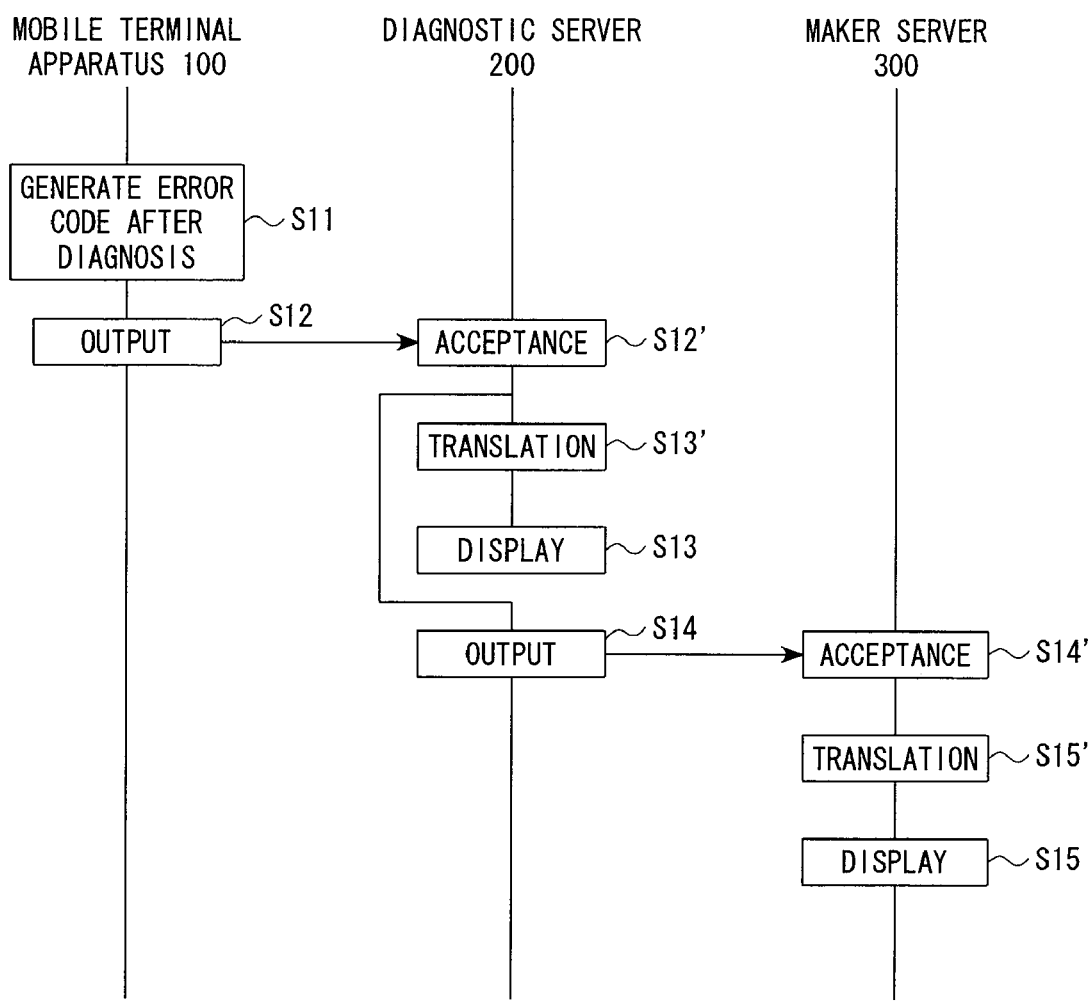
FIG. 10 is a sequence diagram showing a process for each device in FIG. 9.

FIG. 10 is a sequence diagram showing a process for each device. In FIG. 10, an error code EC is generated after the diagnostic program within the mobile terminal apparatus 100 is executed (step S11). The generated error code EC is outputted from the mobile terminal apparatus 100 (step S12), and accepted by the diagnostic server 200 (step S12').

In the diagnostic server 200, the error code is translated into the display character string (step S13'). This display character string after translation is displayed on the operator screen 24 (step S13).

Further, the error code is outputted from the diagnostic server 200 (step S14), and accepted by the maker server 300 (step S14'). In the maker server 300, the error code is also translated into the display character string (step S15'). This display character string after translation is displayed on the operator screen 26 (step S15).

In this above way, the error code is translated into the character string recognizable by the user and displayed, while the error code, not the log or character string, is sent or received between the devices, whereby the communication cost can be reduced.

(Grasping the Fault Cause by the User and a Notification Process to the Operator)

Figure 11:
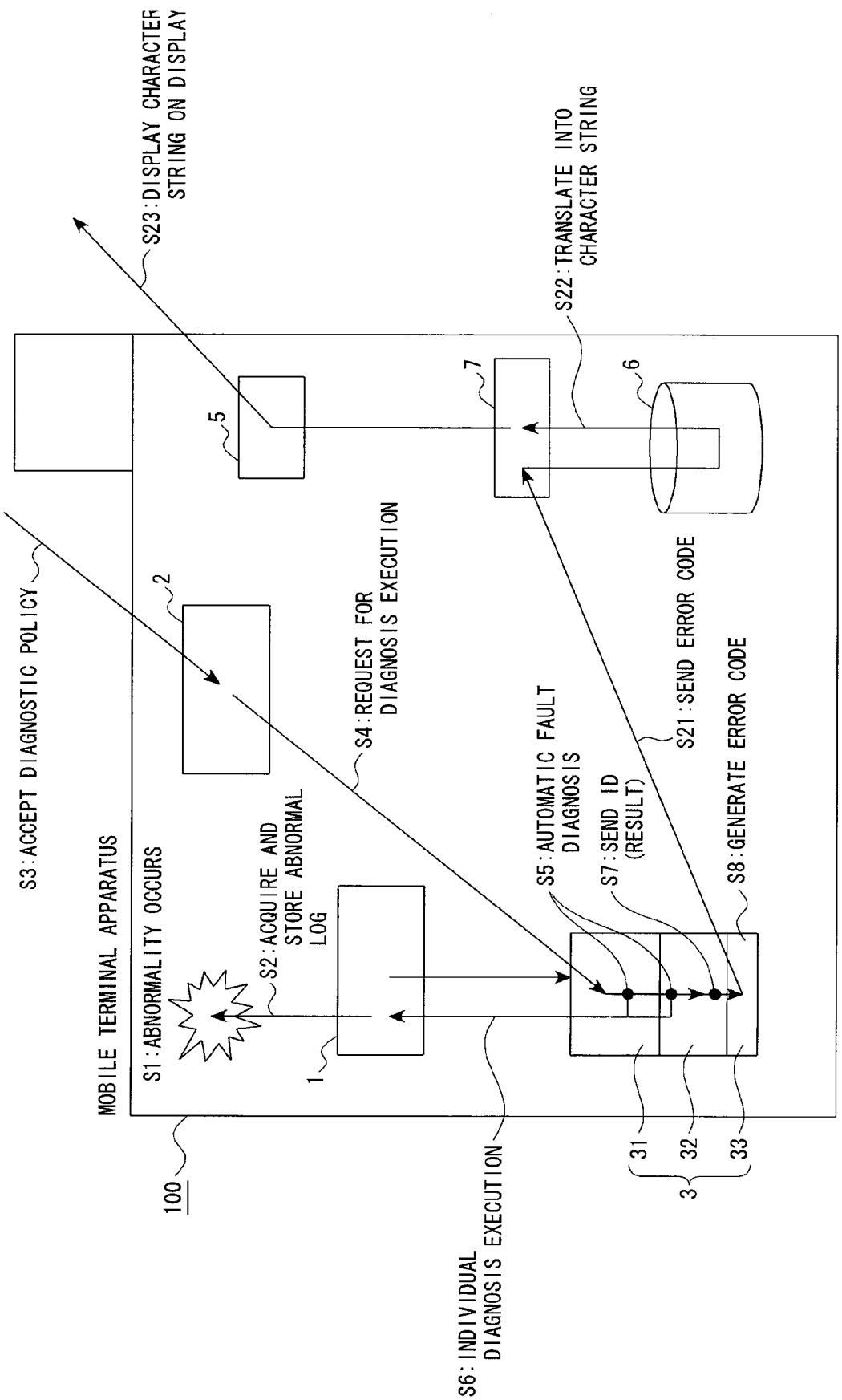
FIG. 11 is a view showing a process for displaying the fault cause to the user.

Referring to FIG. 11, a process for displaying the fault cause to the user, not sending the error code to the diagnostic server, will be described below. In FIG. 11, an error code is generated (step S8) in the same way as in FIG. 3 and the error code is sent to the error code translation function 7 (step S21). In the error code translation function 7, the error code is translated into the display character string indicating the fault cause (step S22). In this case, the error code is translated into the display character string recognizable by the user, using the error code translation table 6. And the display character string after translation is outputted to the display of the mobile terminal apparatus 100 with the display output function 5 (step S23).

Figures 12, 13:
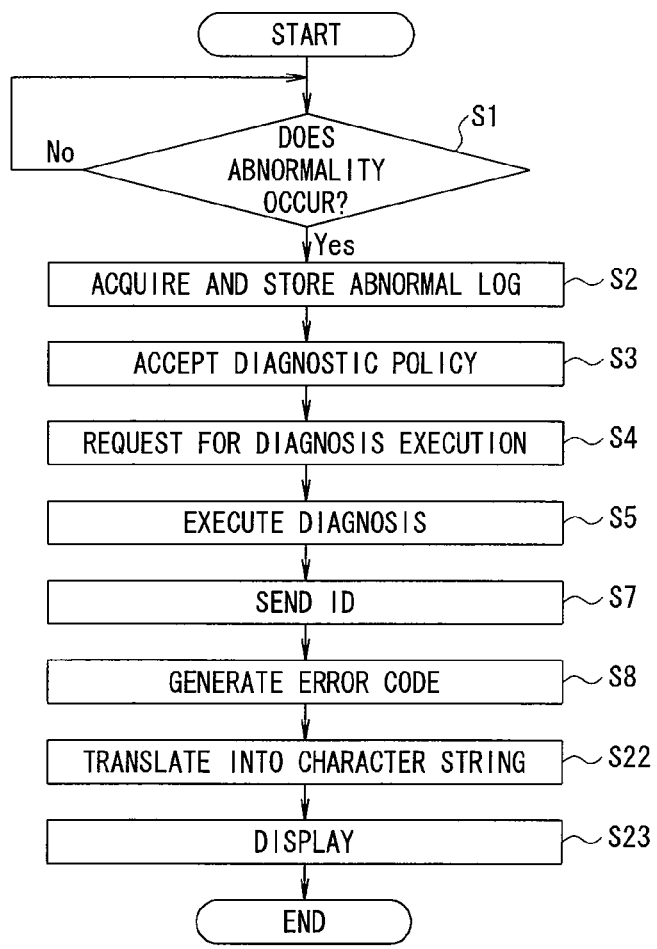
FIG. 12 is a view showing a configuration example of an error code translation table.
FIG. 13 is a flowchart corresponding to the process as explained with reference to FIG. 11.

FIG. 12 is a view showing a configuration of the error code translation table 6. The error code translation table 6 lists the error code and the corresponding display character string associated with it, as shown in FIG. 12. For example, the error code "012-345-678" on the memory use ratio outputted in the above example is translated into the display character string "memory use amount exceeded" or "event start limit exceeded (memory use amount exceeded)" in accordance with the error code translation table 6. This display character string is outputted to the display of the mobile terminal apparatus 100. Also, in this example, the error code "012-001-001" is translated into the display character string "application area capacity exceeded", and the error code "012-345-677" is translated into the display character string "memory use amount exceeded" in accordance with the error code translation table 6, in which the display character string is outputted to the display of the mobile terminal apparatus 100. The other detailed process is the same as in FIG. 5.

FIG. 13 is a flowchart corresponding to the process as explained with reference to FIG. 11. In FIG. 11, if an abnormality occurs on standby, an abnormal log is acquired and stored (step S1→S2). Thereafter, a diagnostic policy is accepted (step S3), and a diagnosis execution request is sent (step S4). Thereby, the diagnostic program is executed (step S5).

The ID (or IDs) with the abnormal diagnostic result among the IDs indicating the items of the diagnostic program is sent (step S7), and an error code is generated (step S8). The generated error code is further translated into the display character string (step S22). And the display character string after translation is outputted to the display of the mobile terminal apparatus 100 (step S23).

In this above way, the error code is translated into the display character string recognizable by the user and displayed, whereby the user can grasp the fault cause and notify the fault cause to the window of the communication carrier on his own. Though a notice from the user is required in the above process, the communication cost can be reduced because the log information itself is not sent. Also, since the troubleshooting is expected in real time from the dealing window, this point is a merit unlike the case of FIG. 3.

(Update Process for Error Code List in the Mobile Terminal Apparatus)

Figure 14:
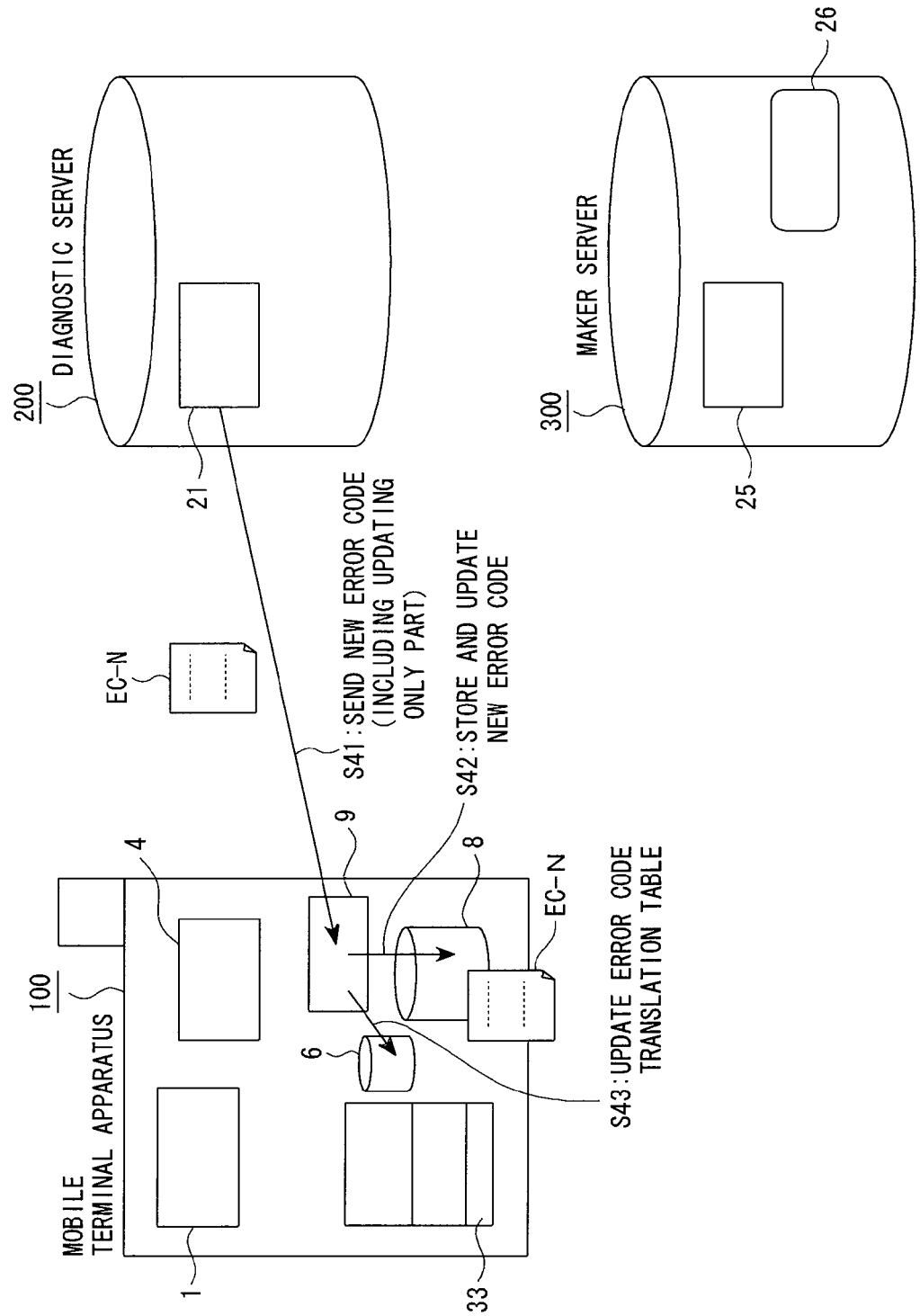
FIG. 14 is a view showing an update process for an error code list stored in the mobile terminal apparatus.

By the way, the list of error code may be updated in some cases. Referring to FIG. 14, an update process for the list of error code stored in the mobile terminal apparatus 100 will be described below. In FIG. 14, the new error code EC-N as updated is sent from the diagnostic policy sending function 21 within the diagnostic server 200 to the mobile terminal apparatus 100 (step S41). The error code update function 9 within the mobile terminal apparatus 100 accepts the error code EC-N sent from the diagnostic server 200 and verifies its correctness. As a result of this verification, if there is no problem, the new error code EC-N is passed to the error code list storage function 8. The error code list storage function 8 stores the new list of error code by replacing the current error code with the new error code or adding the new error code to the list of error code, whereby the update is completed (step S42).

As the new error code is added, it may be required that the error code translation table 6 is update (step S43). That is, when the display character string corresponding to the new error code is required to add, the content of the error code translation table 6 is replaced or added. If the display character string may be unchanged even though the new error code is added, it is not required that the content of the error code translation table 6 is replaced or added. For example, if the error code is different but the abnormal content is the same, the same display character string can be used, whereby it is not required that the content of the error code translation table 6 is replaced or added.

Figure 15:
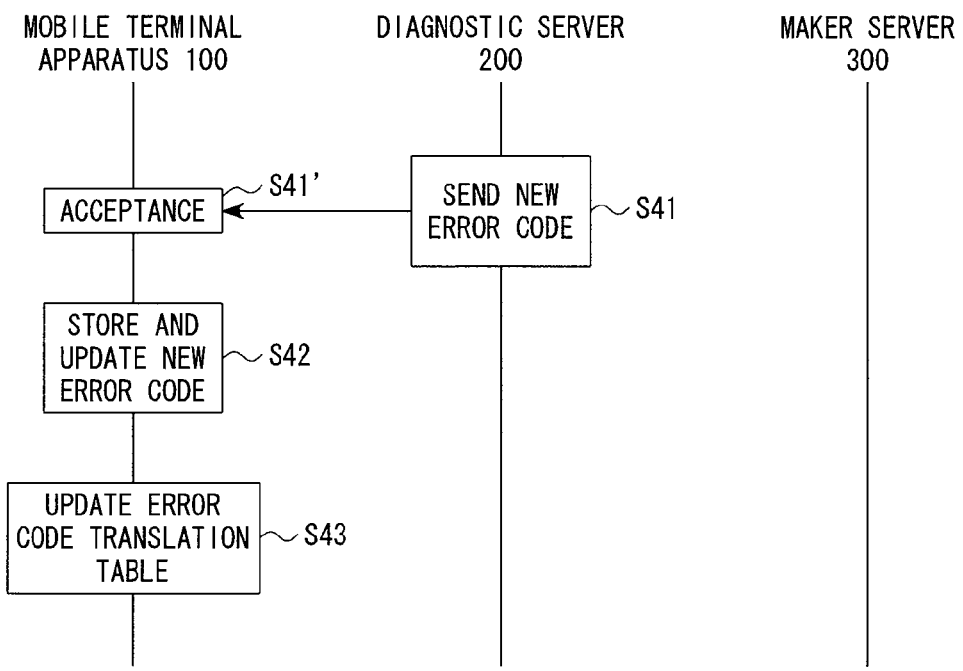
FIG. 15 is a sequence diagram showing a process for each device in FIG. 14.

FIG. 15 is a sequence diagram showing a process for each device. In FIG. 15, the new error code EC-N as updated is sent from the diagnostic server 200 to the mobile terminal apparatus 100 (step S41). The new error code EC-N sent is accepted in the mobile terminal apparatus 100 (step S41').

And the new error code is stored by replacing the current list of error code with the new list of error code or adding the new error code (step S42). Also, the error code translation table 6 is updated, if required (step S43).

Herein, the error code of this example is composed of three items from the first item to the third item, whereby each item can be independently updated. For example, it is possible that the first item indicating the maker and model is not updated but the second and third items are updated. In this way, by adopting a method for updating the error code by subdividing it into items, the difference information sent at the time of update can be reduced. Therefore, it is possible to suppress the occurrence of inconsistent collation result due to update of excess information and reduce the communication cost for sending via the network.

The more specific examples for the error code and its generation will be described below.

(First Example of Error Code)

Figure 16:
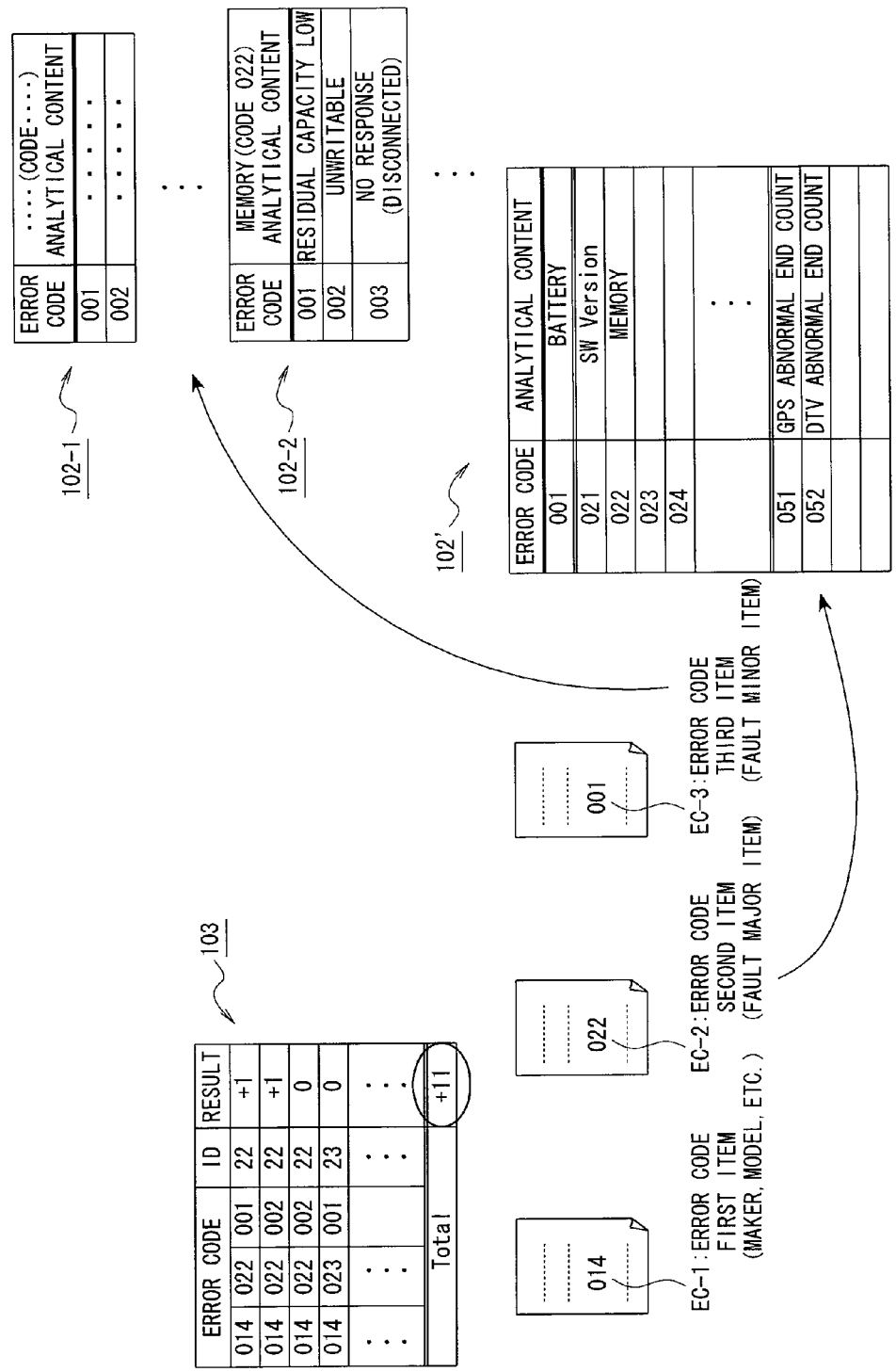
FIG. 16 is a view showing a first example of the error code.

FIG. 16 is a view showing a first example of error code in this system. In FIG. 16, a diagnostic policy file is received and the diagnostic program is executed in accordance with the diagnostic policy file in this example. And an error code is generated based on the ID of the execution result. In this case, the ID is translated into the error code by referring to the list of error code stored in the error code list storage function 8 to generate the error code. In this example, since the result 103 of Total "+11" is obtained by executing the diagnostic program, it can be found that the errors exist in eleven items.

The error code of this example as shown in FIG. 16 has the first item EC-1 of "014" indicating the maker and model, the second item EC-2 of "022" indicating the functional element within the mobile terminal apparatus where the fault occurs as a fault major item, and the third item EC-3 of "001" indicating the detailed content of abnormality or fault that occurs as a fault minor item.

The fault major item that is the second item of error code has the same content as the analytical content 102' of the diagnostic program. The fault minor item that is the third item of error code may be divided into files for every code, or one file. When it is divided into files for every code, such as files 102-1, 102-2, it is required to send the files for the needed code only at the time of update, whereby the update process can be performed efficiently.

Herein, there are some cases that plural kinds of errors can be detected from the error code for the same item. In this example, the result 103 of diagnostic item indicates that the error code "022" for the "memory" that is the analytical content includes two errors of residual capacity low "001" and unwritable "002".

Figure 17:
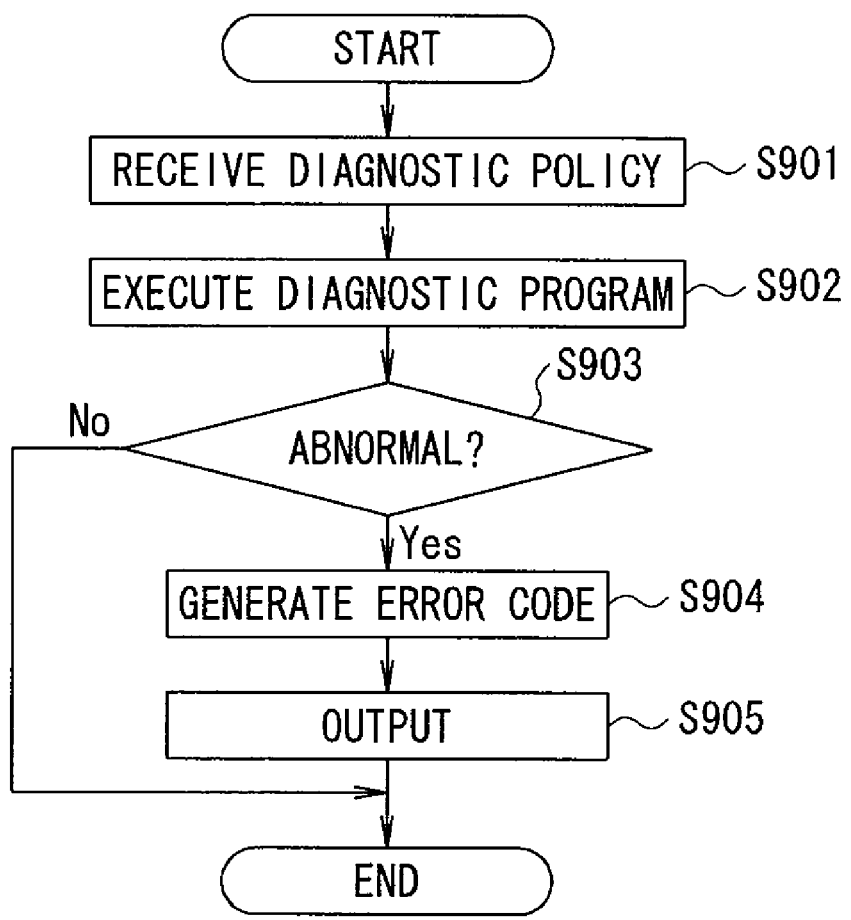
FIG. 17 is a flowchart corresponding to the process as explained with reference to FIG. 15.

FIG. 17 is a flowchart showing the operation contents of the mobile terminal apparatus, corresponding to the above process. In FIG. 17, firstly, a diagnostic policy file is received (step S901). Next, the diagnostic program is executed in accordance with the received diagnostic policy file (step S902). And a determination whether or not there is abnormality is made (step S903). If the determination that there is abnormality is made, an error code is generated based on the ID of the execution result (step S904). The generated error code is sent to the diagnostic server or translated into the display character string, and then displayed on the display of the mobile terminal apparatus (step S905).

(Second Example of Error Code)

Figure 18:
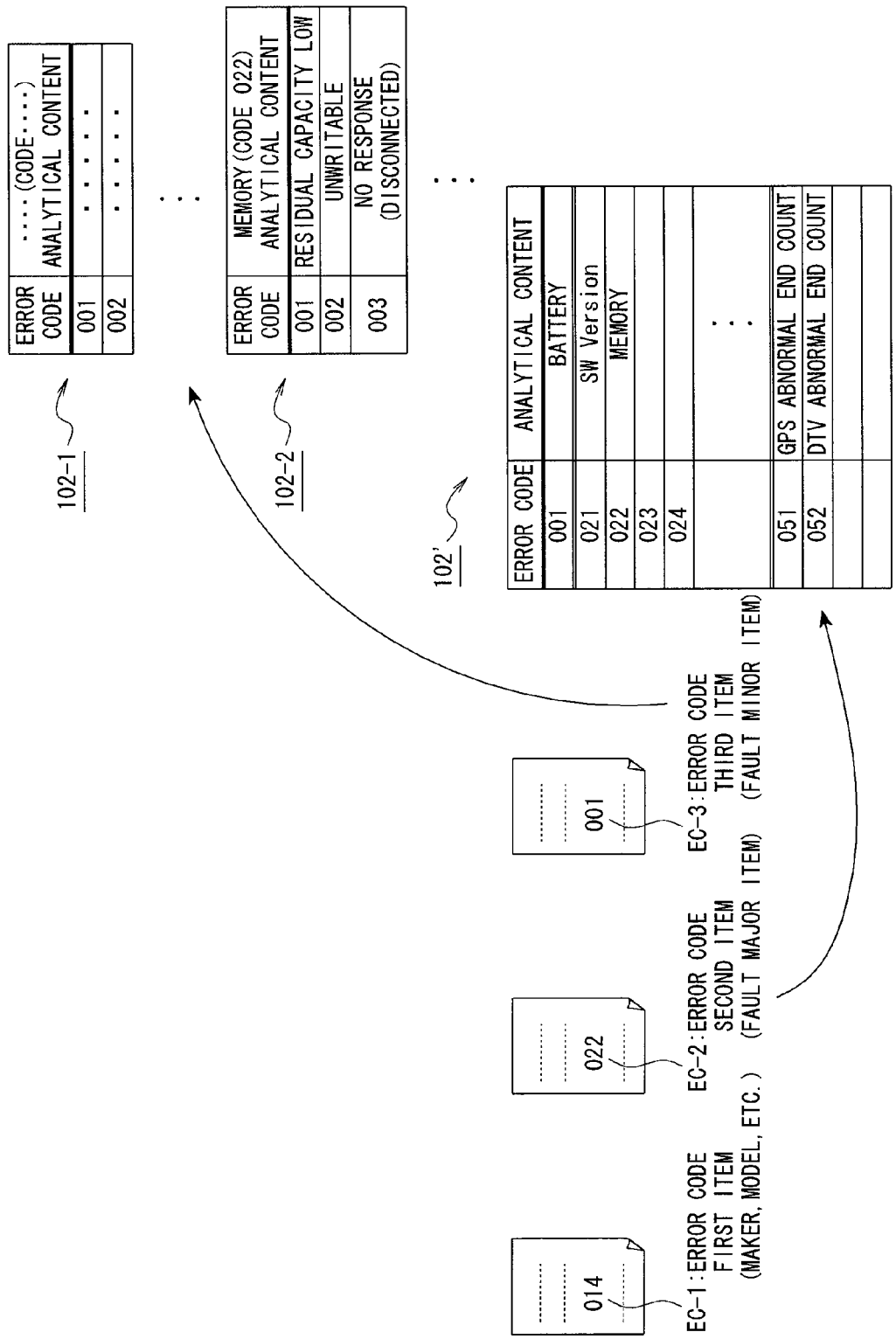
FIG. 18 is a view showing a second example of the error code.

FIG. 18 is a view showing a second example of the error code in this system. In FIG. 18, if a diagnostic policy file is received, a common diagnostic request and an individual diagnostic request are stored in the same file. And, firstly, the common diagnostic program is executed in accordance with the diagnostic policy file. And the common diagnostic item or not is judged by the error code. For example, the 51st and following items may be the common diagnostic item. Also, the file of the second item may be divided according to the common diagnostic program and the individual diagnostic program, and the common diagnostic program only may be executed.

Next, an error code is generated based on the ID of the execution result. In this case, the ID is translated into the error code by referring to the list of error code stored in the error code list storage function 8 to generate the error code.

Thereafter, a determination whether or not there is abnormality is made in the same way as the first example. That is, if the total of the execution results does not exceed a certain threshold, the determination that there is no abnormality is made. In this case, the individual diagnostic program is executed. If the determination that there is abnormality is made, the error code is generated by referring to the list of error code in the same way as the first example.

In this example, the fault major item that is the second item of error code has the same content as the analytical content of the diagnostic program. The fault minor item that is the third item of error code may be divided into files for every code, or one file. When it is divided into files for every code, it is necessary to send the files for the needed code only at the time of update, whereby the update process can be performed efficiently.

Figure 19:
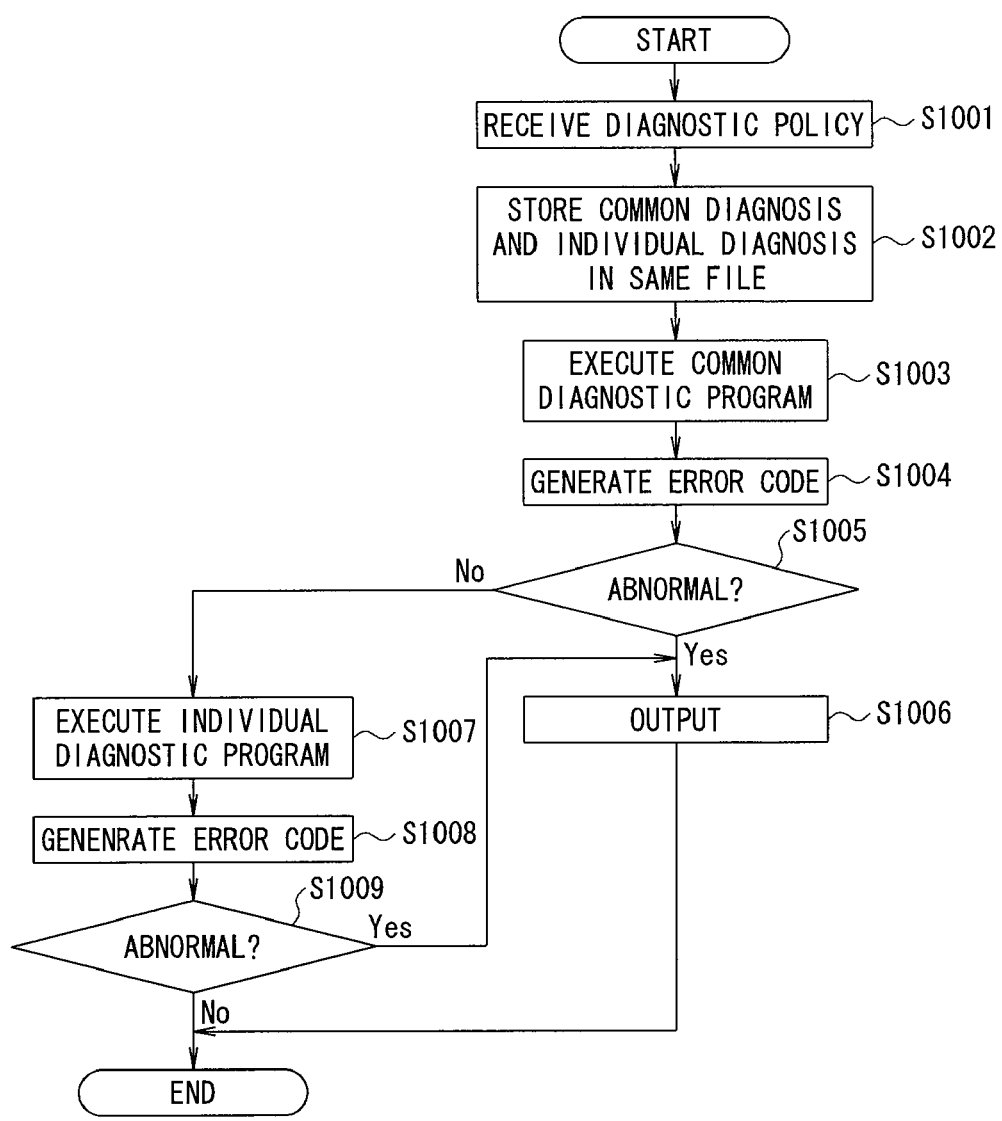
FIG. 19 is a flowchart corresponding to the process as explained with reference to FIG. 18.

FIG. 19 is a flowchart showing the operation contents of the mobile terminal apparatus, corresponding to the above process. In FIG. 19, firstly, a diagnostic policy file is received (step S1001). Then, the item on the common diagnostic program and the item on the individual diagnostic program included in the diagnostic policy file are stored in the same file (step S1002).

Next, the common diagnostic program is executed in accordance with the received diagnostic policy file (step S1003). And an error code is generated based on the ID of the execution result (step S1004). Thereafter, a determination whether or not there is abnormality is made (step S1005). If the determination that there is abnormality is made (i.e., the total value of the execution results of the common diagnostic program exceeds the threshold), the generated error code is sent to the diagnostic server, or translated into the display character string, and then displayed on the display of the mobile terminal apparatus (step S1006). Thus, the process is ended.

On the other hand, if the determination that there is no abnormality is made (i.e., the total value of the execution results of the common diagnostic program does not exceed the threshold), the individual diagnostic program is executed (step S1007). And an error code is generated based on the ID of the execution result (step S1008). And a determination whether or not there is abnormality is made (step S1009). If the determination that there is abnormality is made, the generated error code is sent to the diagnostic server, or translated into the display character string, and then displayed on the display of the mobile terminal apparatus (step S1006). On the other hand, if the determination that there is no abnormality is made, the process is ended.

(Third Example of Error Code)

Figure 20:
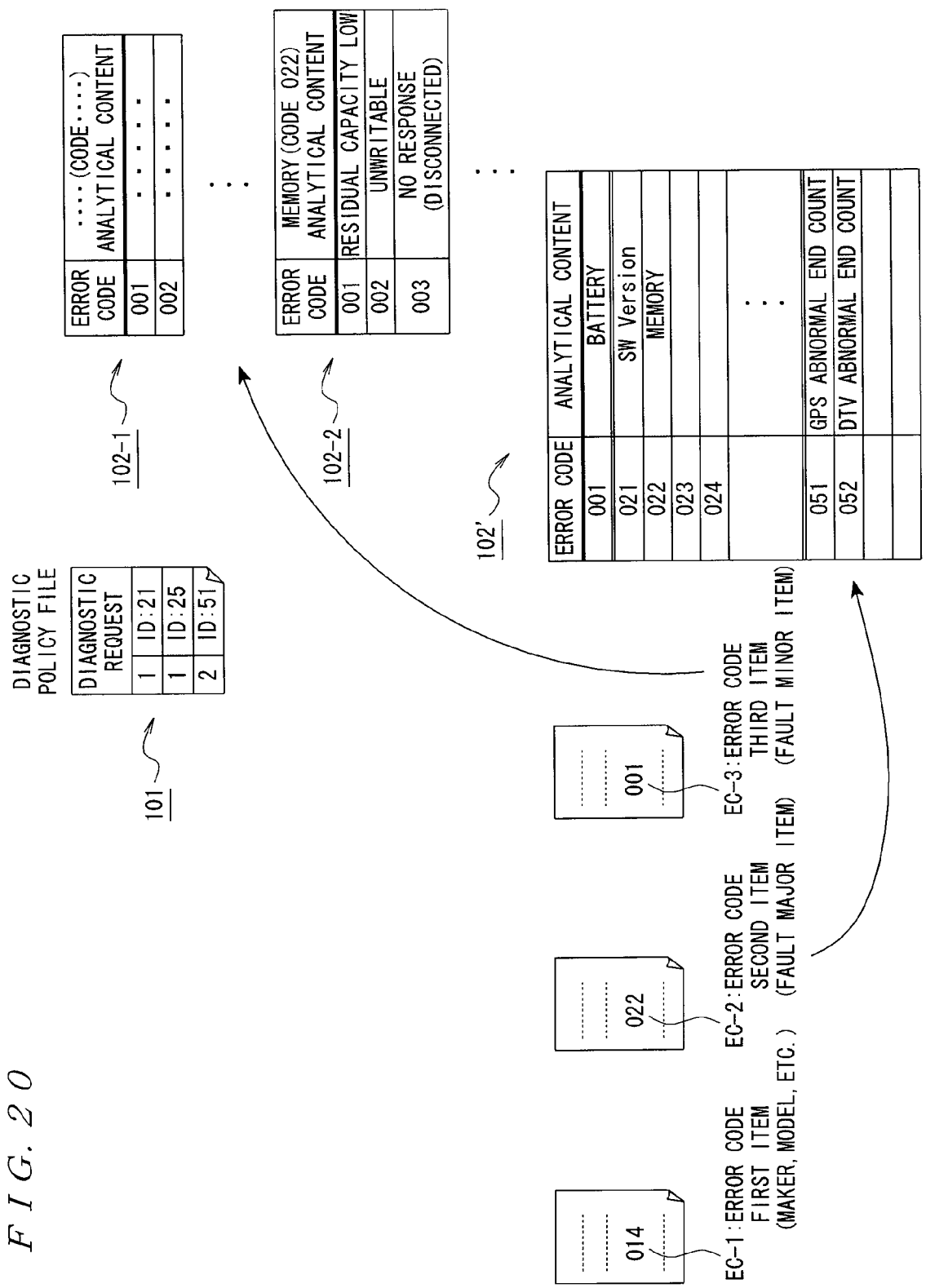
FIG. 20 is a view showing a third example of the error code.

FIG. 20 is a view showing a third example of error code in this system. In this example as shown in FIG. 20, if a diagnostic policy file 101 is received, a diagnostic request for the common diagnostic program and a diagnostic request for the individual diagnostic program are separately stored in the different files. For example, the file name may be different, or different flag information may be appended to separate the requests.

In the latter case, for example, "1" for the common diagnostic program and "2" for the individual diagnostic program may be appended as flag information to separate the requests. In this case, the diagnostic policy file may be divided into two rows to arrange the flag information in the first row and the ID of analytical content in the second row.

And, firstly, the common diagnostic program is executed in accordance with the diagnostic policy file. Next, an error code is generated based on the ID of the execution result. In this case, the ID is translated into the error code by referring to the list of error code stored in the error code list storage function 8 to generate the error code.

Thereafter, a determination whether or not there is abnormality is made in the same way as the first example. That is, if the total of the execution results does not exceed a certain threshold, the determination that there is no abnormality is made. In this case, the individual diagnostic program is executed. If the determination that there is abnormality is made, an error code is generated by referring to the list of error code in the same way as the first example.

In this example, the fault major item that is the second item of error code has the same content as the analytical content of the diagnostic program. The fault minor item that is the third item of error code may be divided into files for every code, or one file. When it is divided into files for every code, it is necessary to send the files for the needed code only at the time of update, whereby the update process can be performed efficiently.

Figure 21:
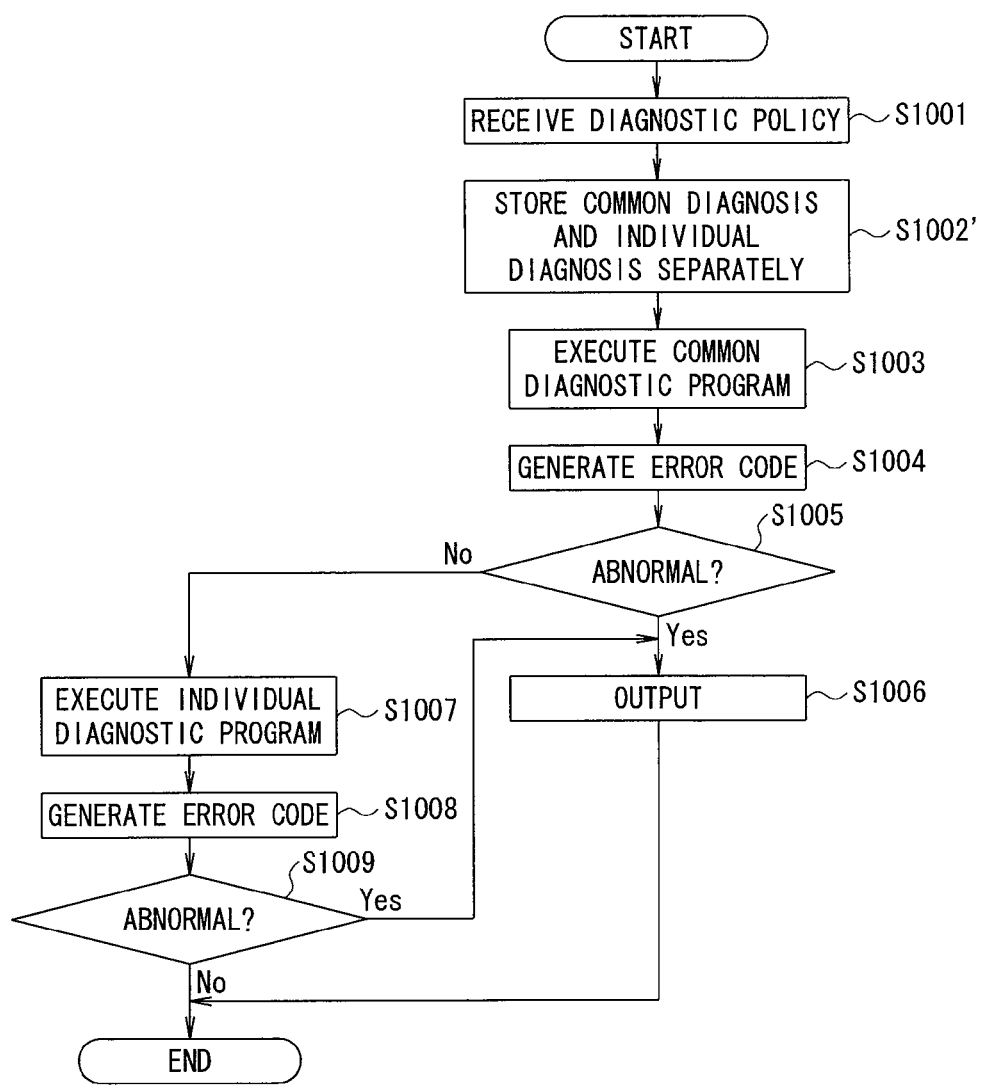
FIG. 21 is a flowchart corresponding to the process as explained with reference to FIG. 20.

FIG. 21 is a flowchart showing the operation contents of the mobile terminal apparatus, corresponding to the above process. In FIG. 21, firstly, a diagnostic policy file is received (step S1001). Then, the item on the common diagnostic program and the item on the individual diagnostic program included in the diagnostic policy file are separately stored in the different files (step S1002'). The following process is the same as the second example explained with reference to FIG. 19, and not described here.

(Fourth Example of Error Code)

Figure 22:
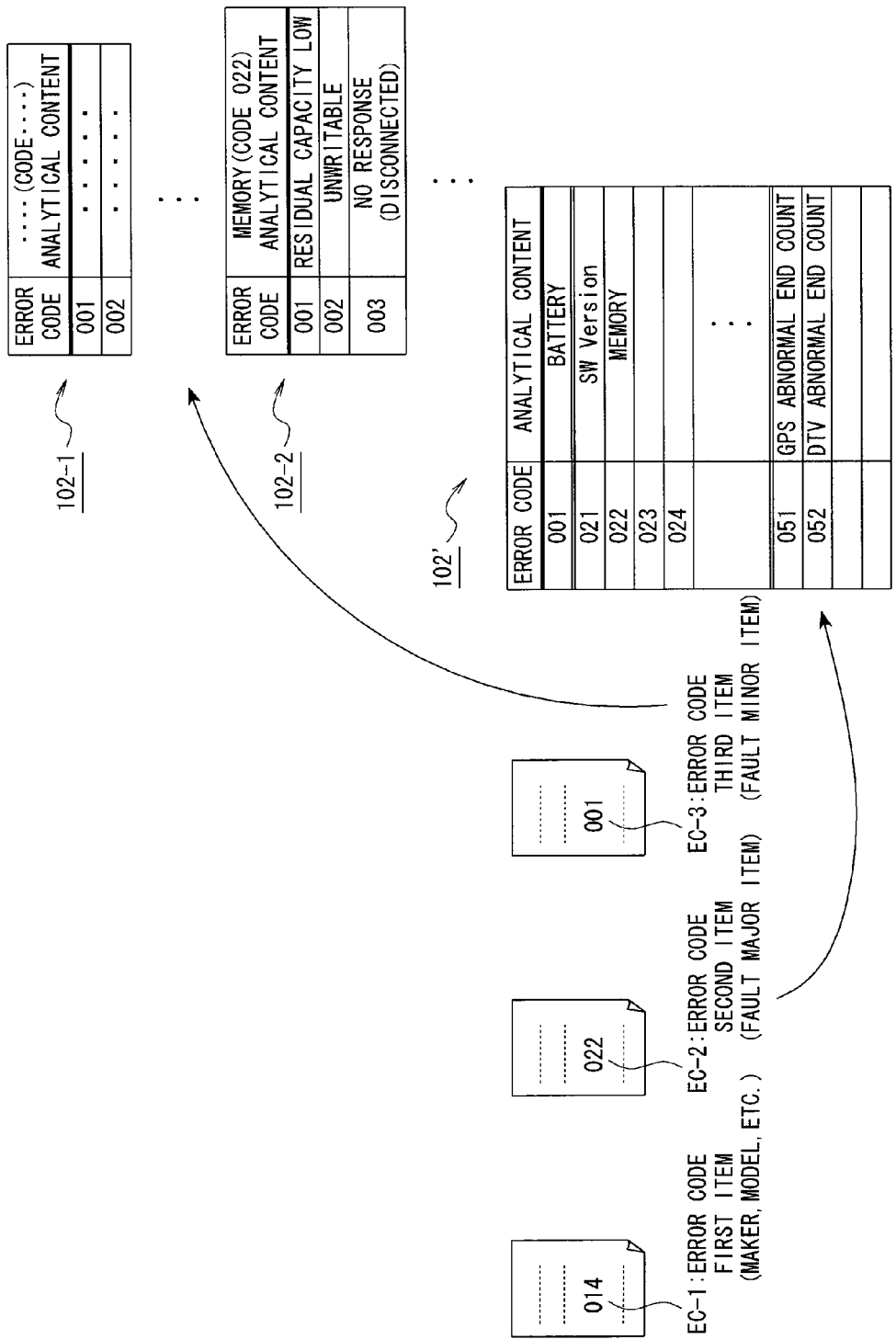
FIG. 22 is a view showing a fourth example of the error code.

FIG. 22 is a view showing a fourth example of error code in this system. In this example as shown in FIG. 22, a diagnostic policy file is divided into two and received twice. That is, firstly, the diagnostic policy file for only the common diagnostic request is received, and after determination whether or not there is abnormality, the diagnostic policy file for the individual diagnostic request is received.

Firstly, the common diagnostic program is executed in accordance with the diagnostic policy file for the common diagnostic request. An error code is generated based on the ID of the execution result. In this case, the ID is translated into the error code by referring to the list of error code stored in the error code list storage function 8 to generate the error code.

Thereafter, a determination whether or not there is abnormality is made. If the total of the execution results does not exceed a certain threshold, the determination that there is no abnormality is made. If the determination that there is no abnormality is made because the threshold is not exceeded, the mobile terminal apparatus 100 requests the diagnostic server 200 to send the diagnostic policy file for the individual diagnostic request.

Thereafter, the diagnostic policy file for the individual diagnostic request is received, and the individual diagnostic program is executed in accordance with the diagnostic policy file. The following process is the same as the first example.

In this example, the fault major item that is the second item of error code has the same content as the analytical content of the diagnostic program. The fault minor item that is the third item of error code may be divided into files for every code, or one file. When it is divided into files for every code, it is necessary to send the files for the needed code only at the time of update, whereby the update process can be performed efficiently.

Figure 23:
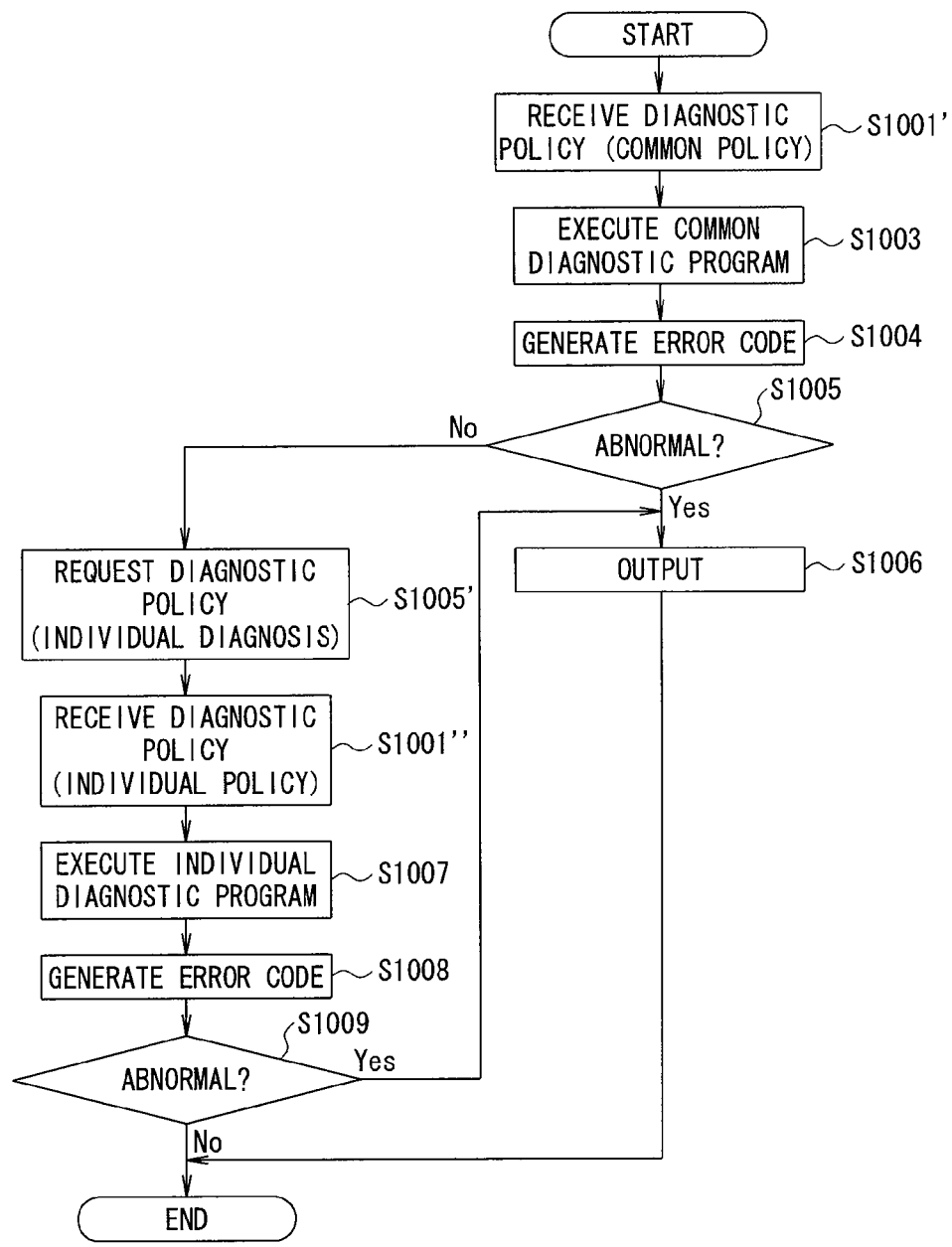
FIG. 23 is a flowchart corresponding to the process as explained with reference to FIG. 22.

FIG. 23 is a flowchart showing the operation contents of the mobile terminal apparatus, corresponding to the above process. In FIG. 23, firstly, a diagnostic policy file regarding the common diagnostic program is received (step S1001'). Next, the common diagnostic program is executed in accordance with the received diagnostic policy file (step S1003).

And an error code is generated based on the ID of the execution result (step S1004). Thereafter, a determination whether or not there is abnormality is made (step S1005). If the determination that there is abnormality is made (i.e., the total value of the execution results of the common diagnostic program exceeds a threshold), the generated error code is sent to the diagnostic server, or translated into the display character string, and then displayed on the display of the mobile terminal apparatus (step S1006). Thus, the process is ended.

On the other hand, if the determination that there is no abnormality is made (i.e., the total value of the execution results of the common diagnostic program does not exceed the threshold), the mobile terminal apparatus requests the diagnostic server to send a diagnostic policy file regarding the individual diagnostic program (step S1005'). Thereafter, if the diagnostic policy file regarding the individual diagnostic program is outputted from the diagnostic server, it is received (step S1001"). And the individual diagnostic program is executed (step S1007). The following process is the same as the third example explained with reference to FIG. 21, and not described here.

(Fifth Example of Error Code)

Figure 24:
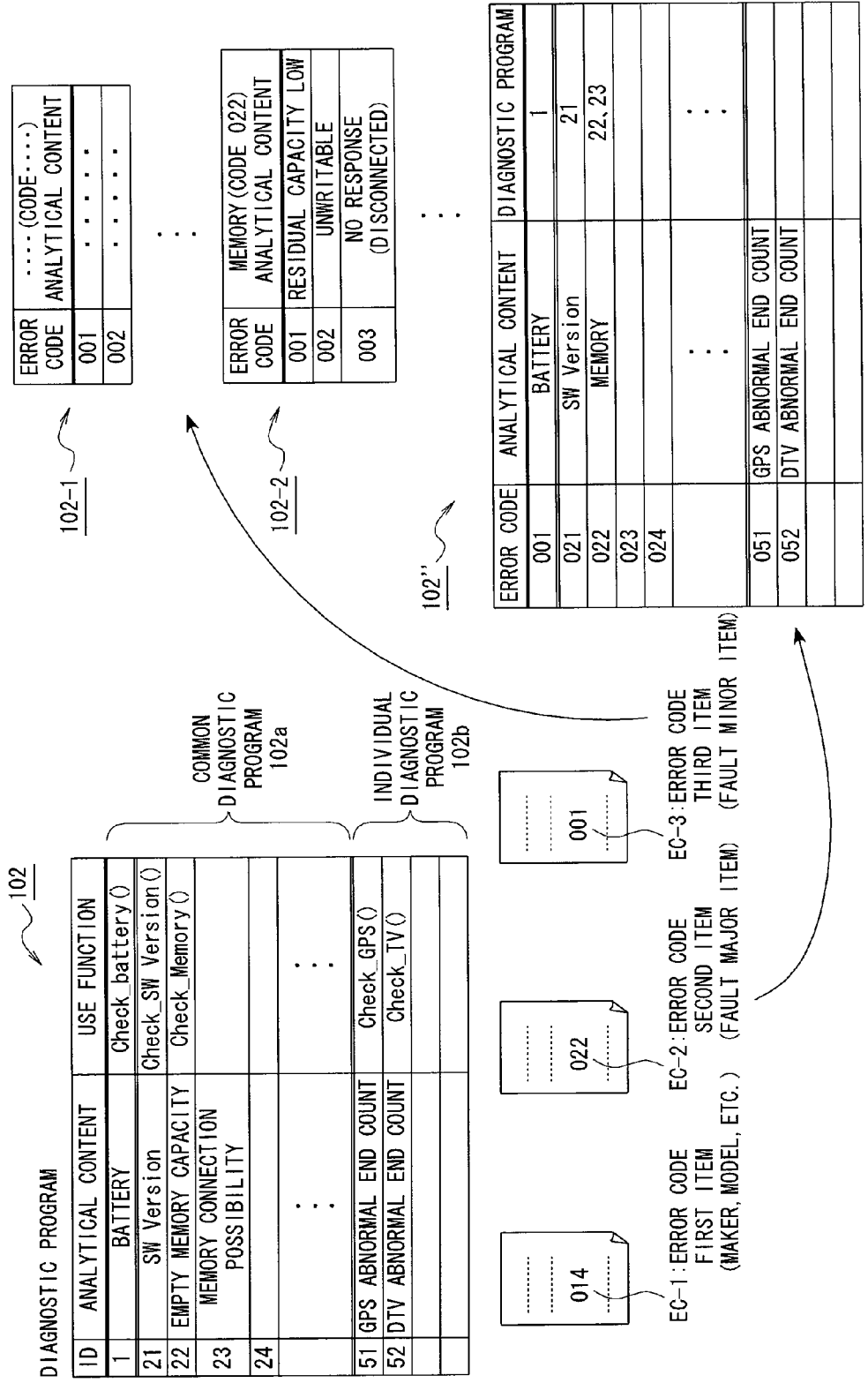
FIG. 24 is a view showing a fifth example of the error code.

FIG. 24 is a view showing a fifth example of error code in this system. In FIG. 24, this example is a variation of the first example. This example is different from the first example in the second item of error code. That is, referring to FIG. 24, the second item of error code has the same content as the analytical content 102" of the diagnostic program. That is, the second item of error code has "diagnostic program ID", besides "error code" and "analytical content", as the items. The "diagnostic program ID" is the ID indicating the item of the diagnostic program. In this example, the diagnostic program ID "1" is the analytical content "battery" that is the item of the diagnostic program, corresponding to the use function "Check battery( )". Also, the diagnostic program ID "21" is the analytical content "SW Version" that is the item of the diagnostic program, corresponding to the use function "Check SW Version( )". Further, the diagnostic program ID "22" is the analytical content "empty memory capacity" that is the item of the diagnostic program, corresponding to the use function "Check Memory( )".

In this example, a diagnostic policy file is received, and the diagnostic program is executed in accordance with the diagnostic policy. And an error code is generated based on the ID of the execution result. In this case, the ID is translated into the error code by referring to the list of error code stored in the error code list storage function 8 to generate the error code.

The fault major item that is the second item of error code has the above contents. The fault minor item that is the third item of error code may be divided into files for every code, or one file. When it is divided into files for every code, it is necessary to send the files for the needed code only at the time of update, whereby the update process can be performed efficiently.

The processing contents of this example are the same as the first example explained with reference to FIG. 17, and not described here.

(Diagnosis Method for Mobile Terminal Apparatus)

Figure 25:
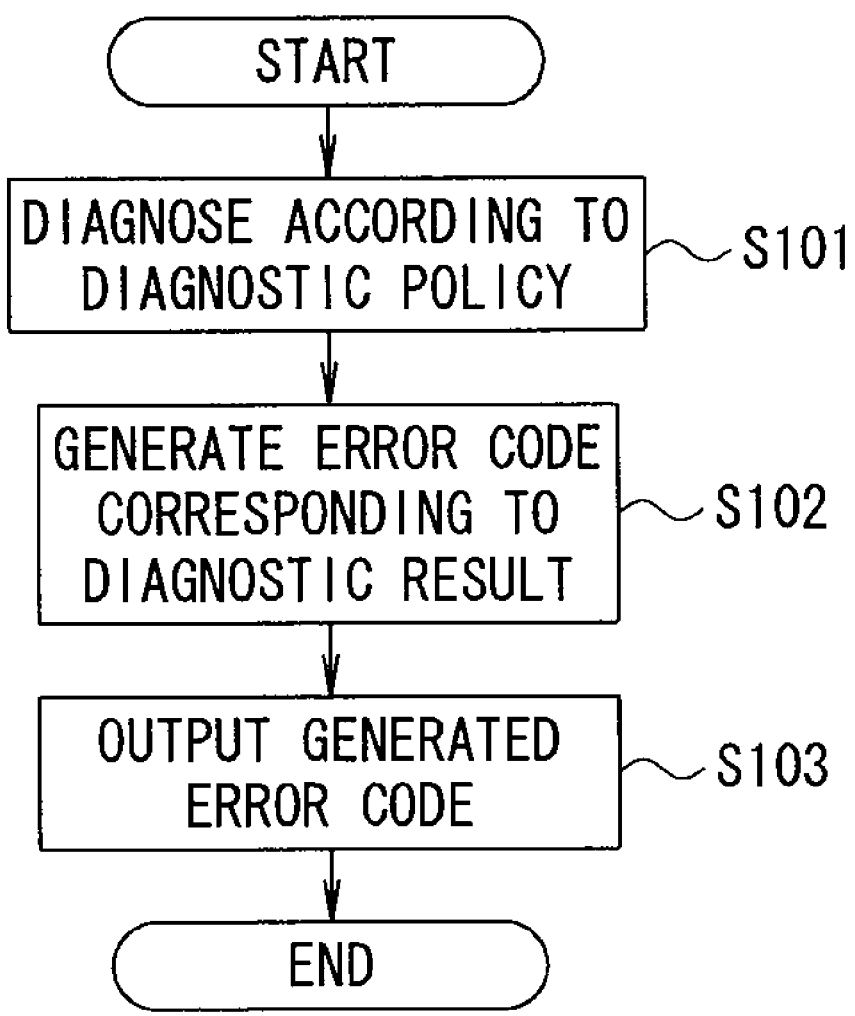
FIG. 25 is a flowchart showing an example of a diagnosis method for the mobile terminal apparatus according to the invention.

In the above described mobile terminal apparatus, the following diagnosis method is employed. That is, the diagnosis method for the mobile terminal apparatus to diagnose a malfunction in the self system comprises a diagnostic step (step S101) of making a diagnostic process for the malfunction in accordance with a diagnostic policy acquired from the outside, an error code generation step (step S102) of generating an error code corresponding to the diagnostic result at this diagnostic step, and an output step (step S103) of outputting the error code generated at the error code generation step, as shown in FIG. 25. Using this diagnosis method, the diagnostic result for the malfunction is translated into the error code, and the error code after translation is displayed or outputted to the external server, whereby the communication cost or the labor cost on the operation can be made lower than sending the log at the occurrence of fault to the network.

CONCLUSION

The present invention has a function of acquiring the log by automatically operating without needing operation impetus from the user and necessarily detecting the fault occurring in the hardware and software of the mobile terminal apparatus, and a function of analyzing the cause using the log. This analysis result is displayed as the error code that is the character string into which the log is simplified, not the log itself, on the display of the mobile terminal apparatus, whereby the user can grasp the fault cause on the spot. That is, with a fault diagnosis function of automatically analyzing the fault in the mobile terminal apparatus without directly sending the collected log to the analytical server, the communication cost and the labor cost can be reduced.

Also, an error code output function of automatically notifying the error code is employed in this invention. Therefore, the user does not need to take the action of notifying the fault to the diagnosis window on the telephone or the like after grasping the fault cause, and can save the trouble.

The present invention is applicable to the case of diagnosing the malfunction within the mobile terminal apparatus.

What is claimed is:

1. A mobile terminal apparatus that diagnoses a malfunction in the mobile terminal apparatus, comprising:
   a diagnosis unit for performing a diagnostic process for said malfunction in accordance with a diagnostic policy; and
   an error code generation unit for generating an error code corresponding to a diagnostic result of the diagnosis unit;
   wherein the error code generated by said error code generation unit is outputted;
   wherein the diagnostic process includes a common diagnostic program for diagnosing a cause of the malfunction common to all manufacturers of the mobile terminal apparatus and an individual diagnostic program for diagnosing a cause of the malfunction dependent on an individual manufacturer of the mobile terminal apparatus after the common diagnostic program is performed; and wherein the diagnostic process is implemented by performing the common diagnostic program and the individual diagnostic program.

2. The mobile terminal apparatus according to claim 1, further comprising a diagnostic policy acquisition unit for acquiring said diagnostic policy from another unit.

3. The mobile terminal apparatus according to claim 1, wherein said error code includes an item of specifying the model of the terminal apparatus and an item on the content of said malfunction.

4. The mobile terminal apparatus according to claim 1, further comprising a unit for controlling an output destination for the error code generated by said error code generation unit.

5. The mobile terminal apparatus according to claim 1, further comprising a character string translation unit for translating the error code generated by said error code generation unit into the corresponding character string.

6. A diagnosis method for a mobile terminal apparatus to diagnose a malfunction in the mobile terminal apparatus, the method comprising:

performing a diagnostic process for said malfunction in accordance with a diagnostic policy;

generating an error code corresponding to a diagnostic result of said diagnostic process; and outputting the error code generated;

wherein the diagnostic process includes performing a common diagnostic program for diagnosing a cause of the malfunction common to all manufacturers of the mobile terminal apparatus, and performing an individual diagnostic program for diagnosing a cause of the malfunction dependent on an individual manufacturer of the mobile terminal apparatus after the common diagnostic program is performed.

* * * * *